United States Patent
Hirabayashi et al.

(10) Patent No.: US 10,404,848 B2
(45) Date of Patent: Sep. 3, 2019

(54) TERMINAL DEVICE AND REMOTE CONTROL METHOD

(71) Applicant: MAXELL, LTD., Kyoto (JP)

(72) Inventors: Masayuki Hirabayashi, Kyoto (JP); Yasunobu Hashimoto, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/573,812

(22) PCT Filed: May 14, 2015

(86) PCT No.: PCT/JP2015/063918
§ 371 (c)(1),
(2) Date: Nov. 13, 2017

(87) PCT Pub. No.: WO2016/181552
PCT Pub. Date: Nov. 17, 2016

(65) Prior Publication Data
US 2018/0352069 A1 Dec. 6, 2018

(51) Int. Cl.
*G08C 17/02* (2006.01)
*H04M 1/725* (2006.01)
(Continued)

(52) U.S. Cl.
CPC ........ *H04M 1/72533* (2013.01); *G08C 17/02* (2013.01); *H04M 1/72583* (2013.01);
(Continued)

(58) Field of Classification Search
CPC ... H04M 1/72533; G08C 17/02; G06F 3/0488
See application file for complete search history.

(56) References Cited

U.S. PATENT DOCUMENTS 9,704,389 B2 7/2017 Hirabayashi
2004/0121725 A1* 6/2004 Matsui .................. G08C 17/02
455/3.06
(Continued)

FOREIGN PATENT DOCUMENTS

JP 2004-166193 A 6/2004
JP 2009-303014 A 12/2009
(Continued)

OTHER PUBLICATIONS

Search Report issued in corresponding International Patent Application No. PCT/JP2015/063918, dated Aug. 4, 2015.
(Continued)

*Primary Examiner* — Myron Wyche
(74) *Attorney, Agent, or Firm* — McDermott Will & Emery LLP

(57) ABSTRACT

Provided are a handy terminal device and a remote control method which have good usabilities. It includes a position information acquiring unit that acquires position information on the terminal device, a height information acquiring unit that acquires height information on the terminal device, a direction detecting unit detecting the direction to which the terminal device is pointed, a tilt detecting unit that detects the tilt of the terminal device, and a memory unit that stores the position information and height information on electric equipment. The height information on the terminal device is calculated from the position information and height information on the electric equipment stored in the memory unit and from the position information on and tilt of the terminal device, and the height information acquiring unit is calibrated.

12 Claims, 26 Drawing Sheets

(51) Int. Cl.
H04Q 9/00 (2006.01)
H04W 4/02 (2018.01)
(52) U.S. Cl.
CPC .............. *H04Q 9/00* (2013.01); *H04W 4/023* (2013.01); *G08C 2201/32* (2013.01); *G08C 2201/91* (2013.01); *H04M 1/72569* (2013.01)

(56) References Cited

U.S. PATENT DOCUMENTS

| | | | |
|---|---|---|---|
| 2010/0001893 A1* | 1/2010 | Kim | G08C 17/02 341/176 |
| 2013/0080964 A1* | 3/2013 | Shigeta | G06F 3/0488 715/773 |
| 2014/0009268 A1 | 1/2014 | Oshima et al. | |

FOREIGN PATENT DOCUMENTS

| | | |
|---|---|---|
| WO | 2012/070251 A1 | 5/2012 |
| WO | 2014/196072 A1 | 12/2014 |
| WO | 2015/029231 A1 | 3/2015 |

OTHER PUBLICATIONS

Japanese Office Action issued in corresponding Japanese Patent Application No. 2017-517566, dated Aug. 21, 2018, with English Translation.

* cited by examiner

FIG. 17A
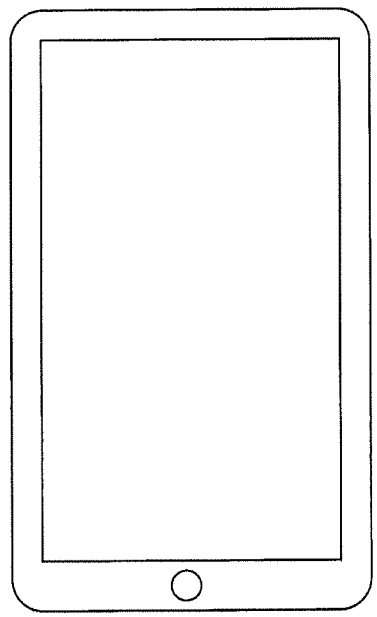
DIRECTION OF GRAVITY
GROUND SURFACE

FIG. 17B
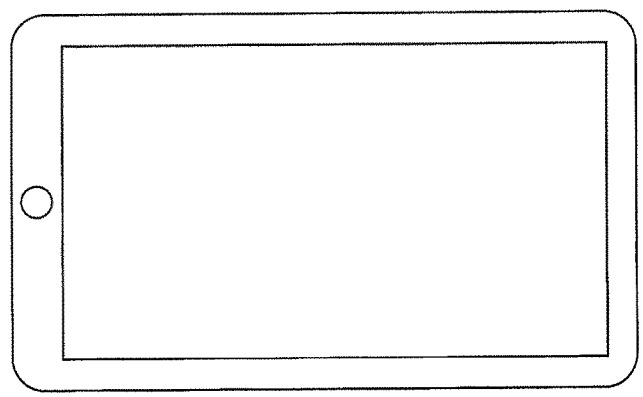
DIRECTION OF GRAVITY
GROUND SURFACE

TERMINAL DEVICE AND REMOTE CONTROL METHOD

CROSS REFERENCE

This application is the U.S. National Phase under 35 U.S.C. § 371 of International Application No. PCT/JP2015/063918, filed on May 14, 2015, the contents of which are hereby incorporated by reference.

TECHNICAL FIELD

The present invention relates to a terminal device and a remote control method.

BACKGROUND ART

There is Patent Document 1 mentioned below as a background art in a technical field of the present invention. Patent document 1 discloses that: as a problem, "When the number of pieces of equipment operated by a single remote controller increases dramatically, a process of selecting the operation-object equipment becomes complicated, operation units of the remote controller also increase, and matching of them with the equipment to be operated becomes a complete structure."; and as a solution to this problem, "The present invention is a controller that controls at least one piece of object equipment, and the controller includes a position information acquiring means that acquires position information on the present controller, a direction information acquiring means that acquires direction information on the controller, a position information receiving means that receives position information on each of pieces of the object equipment, and a narrowing-down means that uses the position information and the direction information on the present controller and the position information on each of the pieces of object equipment to narrow down, as one piece of operation object equipment, some of the pieces of object equipment existing within a predetermined view angle from a direction indicated by the direction information."

RELATED ART DOCUMENTS

Patent Documents

Patent document 1: Japanese Patent Application Laid-open No. 2009-303014

SUMMARY OF THE INVENTION

Problems to be Solved by the Invention

In addition, paragraph [0078] in above Patent Document 1 describes, as a modification of the invention, "The control equipment and the object equipment each have a barometer or GPS for measuring altitude information (a Z axis-directional value) of the present equipment, and the control equipment may use altitude information on the present control equipment and that of the object equipment to narrow down some of the pieces of operation object equipment."

Meanwhile, by adding the altitude information, improvement of usability for the further narrowing-down is expected. However, for example, calibration etc. needed for measuring the altitude information by the barometer is not mentioned particularly.

An object of the present invention is to provide a terminal device and a remote controlling method whose usabilities are improved better.

Means for Solving the Problems

To solve the above problem, for example, configurations recited in a patent scope of claims will be adopted.

The present invention includes a plurality of means for solving the above problems, but an example of them is as follows. A terminal device remote-controlling at least one piece of electric equipment, the terminal device includes: a position information acquiring unit acquiring position information on the terminal device; a height information acquiring unit acquiring height information on the terminal device; a direction detecting unit detecting a direction to which the terminal device is pointed; a tilt detecting unit detecting a tilt of the terminal device; and a memory unit storing position information and height information on the electric equipment, in which the height information on the terminal device is calculated from the position information and height information on the electric equipment stored in the memory unit and from the position information on and the tilt of the terminal device, and the height information acquiring unit is calibrated.

EFFECTS OF THE INVENTION

The present invention can provide the terminal device and the remote controlling method whose usabilities are improved, and has an effect of making it possible for a user(s) to control electric equipment through a simple operation.

BRIEF DESCRIPTIONS OF THE DRAWINGS

FIG. 17A is a diagram showing a posture of a housing of the terminal device according to the second embodiment of the present invention;

FIG. 17B is a diagram showing a posture of a housing of the terminal device according to the second embodiment of the present invention;

DETAILED DESCRIPTION OF PREFERRED EMBODIMENTS

Embodiments will hereinafter be described, referring to drawings.

(First Embodiment)

Figure 1:
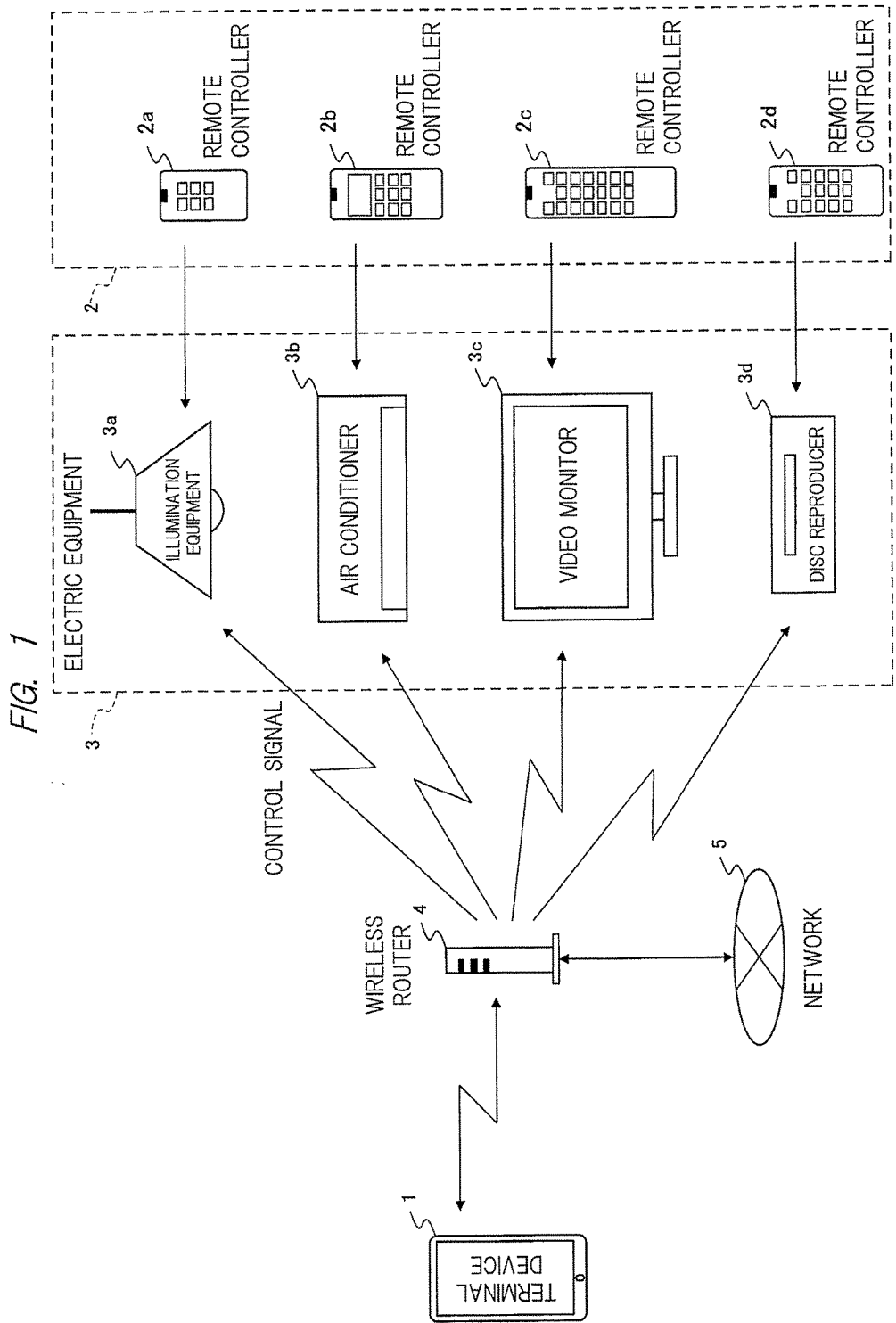
FIG. 1 is a diagram showing a configuration of a remote control system according to a first embodiment of the present invention.

FIG. 1 is a diagram showing a configuration of a remote control system according to a first embodiment of the present invention. The remote control system according to this embodiment includes at least one terminal device and a plurality of pieces of electric equipment.

A terminal device 1 has a wireless communication function, and is capable of transmitting/receiving various pieces of information through an Internet network. The terminal device 1 has also a function of remote controlling electric equipment 3. A user uses the terminal device 1 to be able to remote-control, for example, the electric equipment 3 such as illumination equipment 3a, an air conditioner 3b, a video monitor 3c, and a disc reproducer 3d shown in FIG. 1 through a wireless router 4 described later, or to directly remote-control it without interposing the wireless router 4. Incidentally, the illumination equipment and air conditioner, etc. are exemplified as the electric equipment to be remote-controlled, but as long as any kind of equipment utilizes electric as at least part of control, a gas appliance such as a gas heater or gas cooker, an electric lock, and an automobile, etc. may be used.

A remote controller 2 is a dedicated controller for each piece of electric equipment 3, and is capable of remote-controlling the corresponding electric equipment 3 through infrared communication, etc. For example, as shown in FIG. 1, a remote controller 2a is a dedicated controller for the illumination equipment 3a; a remote controller 2b is a dedicated controller for the air conditioner 3b; a remote controller 2c is a dedicated controller for the video monitor 3c; and a remote controller 2d is a dedicated controller for the disc reproducer 3d.

Set etc. from the terminal device 1 or remote controller 2a can be an on/off state of brightness of the illumination equipment 3a. Set etc. from the terminal device 1 or remote controller 2b can be an on/off state, a mode, or a temperature of the air conditioner 3b. Set etc. from the terminal device 1 or remote controller 2c can be an on/off state, a channel, or sound volume of the video monitor 3c.

Incidentally, the video monitor 3c is an apparatus that receives and displays video contents and, for example, can receive television signals from a broadcasting station by wireless or wire and display audio contents based on the received television signals. The video monitor 3c can also display the audio contents received from a network 5 through the wireless router 4, for example, Internet contents etc. at a URL (Uniform Resource Locator) specified by a user etc. The disc reproducer 3d can reproduce audio/video recorded on a CD (Compact Disc), DVD (Digital Versatile Disc), BD (Blu-ray Disc (registered trademark)), etc., and output the reproduced audio/video to the video monitor 3c, or can reproduce or stop reproducing the audio/video, or select music, of the like from the terminal device 1 or remote controller 2d.

The wireless router 4 has a wireless LAN (Local Area Network) function such as Wi-Fi (Wireless Fidelity) function, and can connect to the network 5 through a communication line. By being connected to the wireless router 4, the terminal device 1 as well as the video monitor 3c can acquire audio contents and various pieces of information from the Internet network, and display the contents and information.

Figure 2:
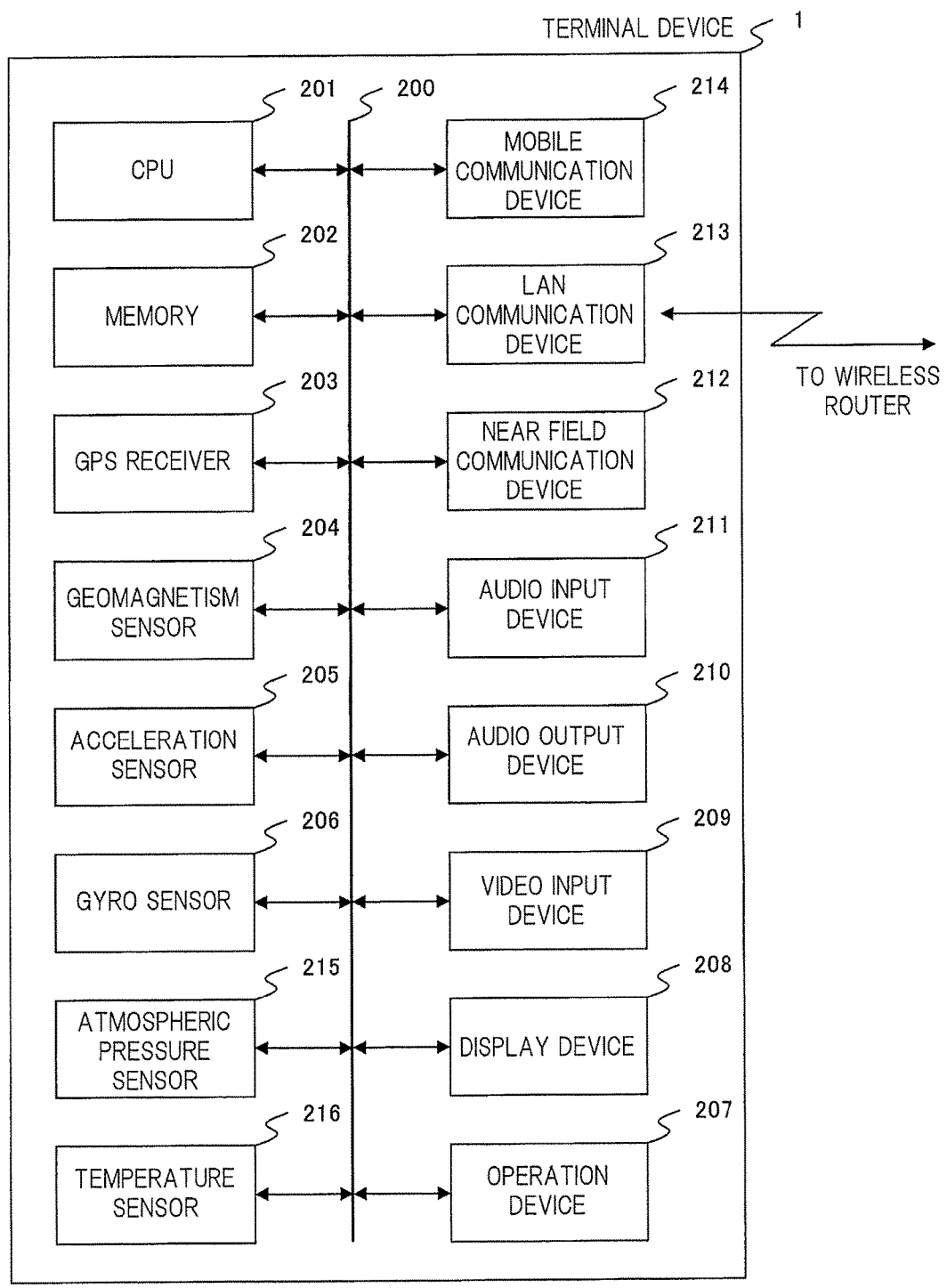
FIG. 2 is a diagram showing an example of a hardware configuration of a terminal device according to the first embodiment of the present invention.

FIG. 2 is a diagram showing an example of a hardware configuration of the terminal device according to the first embodiment of the present invention.

The terminal device 1 may be a cellular phone, a smartphone, a tablet terminal, or a navigation device, etc., or be a PDA (Personal Digital Assistants), or a notebook PC (Personal Computer), etc. It may be a music player, digital camera, or portable game machine, etc. with a communication function, or be other portable digital equipment. The terminal device 1 may also be a communicable wearable smart watch, or smart glasses, etc. In the following, a smartphone will be described as an example of the terminal device 1. However, respective constituent elements of the terminal device 1 can be appropriately added, deleted, or changed depending on each of pieces of electric equipment.

The terminal device 1 is configured by appropriately using, for example, a CPU (Central Processing Unit) 201, a memory 202, a GPS (Global Positioning System) receiver 203, a geomagnetism sensor 204, an acceleration sensor 205, a gyro sensor 206, an operation device 207, a display device 208, a video input device 209, an audio output device 210, an audio input device 211, a near field communication device 212, a LAN communication device 213, a mobile communication device 214, an atmospheric pressure sensor 215, and a temperature sensor 216, and their component units are connected through a bus 200. In addition, the terminal device 1 has application programs stored in the memory 202, and various functions can be realized by the CPU 201 executing the programs. Incidentally, the above component units may be configured integrally with or separately from each other.

The CPU 201 carries out control of the respective component units of the terminal device 1. The CPU 201 may be arbitrary control circuits or dedicated circuits such as ASIC (Application Specific IC), and controls the whole of the terminal device 1 according to a given program.

The memory 202 is composed of a ROM (Read-Only Memory), a RAM (Random Access Memory), or flash ROM, etc., and stores a program for controlling the terminal device 1, or map information, etc.

The GPS receiver 203 has an antenna, and decoding circuit, etc., and is a receiver working as a global positioning system that receives electric waves from a satellite to be able to calculate the position information on the terminal device 1 on the earth.

Incidentally, position accuracy can be enhanced by a DGPS (Differential GPS) that receives a correction signal of a GPS satellite from a base station to correct GPS information. In addition, positon accuracy and altitude accuracy can be further enhanced by a QZSS (Quasi-Zenith Satellite System) that receives a GPS interchangeable signal and a GPS correction signal from a geosynchronous satellite to compensate and reinforce GSP information.

In addition, seamless positional measurement in both indoor and outdoor environments is made possible by an IMES (Indoor Messaging System) that receives a signal compatible with a GPS satellite from an indoor GPS transmitter to acquire position information.

The geomagnetism sensor 204, the acceleration sensor 205, and the gyro sensor 206 are a group of sensors that detect a posture and movement of the housing in the terminal device 1. By this group of sensors, detected can be various pieces of information such as a location, direction, orientation, tilt, movement of the terminal device 1.

The atmospheric pressure sensor 215 measures an ambient atmospheric pressure of the terminal device 1 by using a pressure sensor etc. based on, for example, an MEMS (Micro Electro Mechanical Systems) technology. Based on the atmospheric pressure detected by the atmospheric pressure sensor 215, the CPU 201 can calculate an altitude value of the terminal device 1 at its current location. The CPU may be equipped with other sensor.

The temperature sensor 216 measures an ambient temperature of the terminal device 1. Based on temperature information of the temperature sensor, the CPU 201 can display an ambient temperature on the display, correct a temperature-dependent characteristic(s) of the atmospheric pressure sensor 215, or correct a temperature characteristic(s) etc. of a measured atmospheric pressure with respect to an altitude. The CPU 201 may be further equipped with other sensor.

The operation device 207 is, for example, a touch pad, and receives an operation(s) by the user and transmits, to the CPU 201, an instruction(s) based on the operation.

The display device 208 is, for example, an LC panel, and displays various pieces of information. An apparatus integrated by combining a liquid crystal panel and a touch pad is generally referred to as a touch panel. Also in this embodiment, an example of using the touch panel is described.

The video input device 209 is, for example, a camera, and light inputted from a lens is converted into an electric signal, so that image data on a circumference or an object can be inputted.

The audio output device 209 is composed of, for example, an amplifier and a speaker, and can output various sounds.

The audio input device 211 is, for example, a microphone, and converts the user's voice etc. into audio data, and can input the audio data.

The near field communication device 212 carries out near field wireless communication such as NFC (Near Field Communication), and can input/output various data into/from other near field communication devices or electronic tags in a non-contact manner. The electronic tag referred to also as IC tag or NFC tag is a tag in which an IC chip and a data transmitting/receiving antenna are embedded, and can read out or write in data written in the IC chip in a non-contact manner.

The LAN communication device 213 acquires various pieces of information from the Internet network via the wireless router 4 etc. by using, for example, Wi-Fi etc. In addition, the LAN communication device 213 transmits/receives a control command (s), or status data, etc. to/from the electric equipment 3 via the wireless router 4, etc. and thereby can remote-control the electric equipment 3. In addition, the LAN communication device 213 may directly transmit/receive a control command (s), or status data, etc. to/from the electric equipment 3 via the wireless router 4 by using, for example, a Wi-Fi Direct or Bluetooth link, etc. In addition, the LAN communication device 213 can also calculate position information based on a state of connection with each of local wireless routers.

The mobile communication device 214 can acquire various pieces of information from a server 7 via a mobile network operator's base station 6.

Incidentally, each of the near field communication device 212, the LAN communication device 213, and the mobile communication device 214, etc. appropriately has an antenna, encoding circuit, and decoding circuit, etc.

Figure 3:
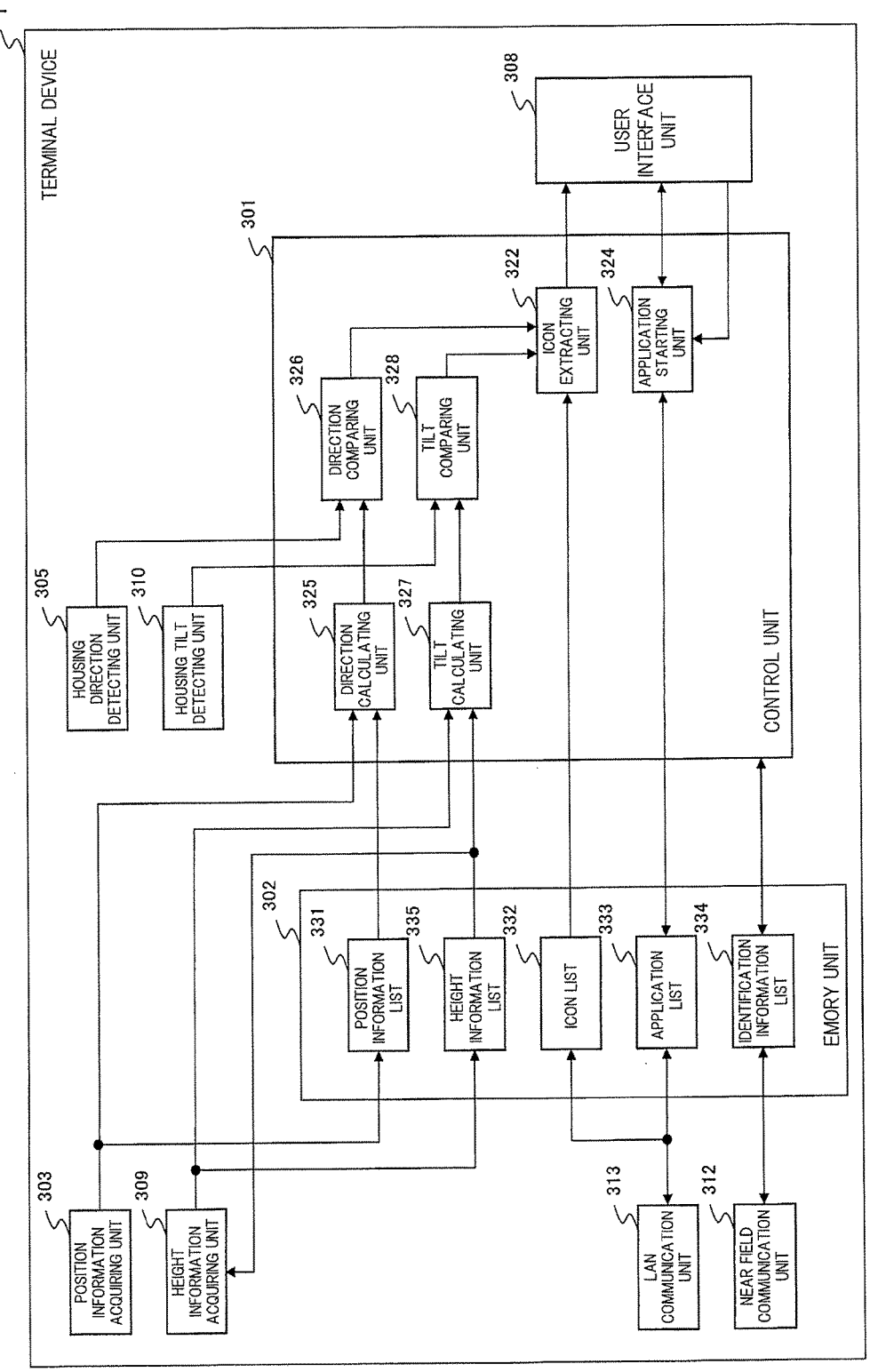
FIG. 3 is a functional block diagram of the terminal device according to the first embodiment of the present invention.

FIG. 3 is a functional block diagram of the terminal device according to the first embodiment of the present invention. Each functional block of the terminal device 1 is controlled and operated by, for example, the CPU 201 included in the terminal device 1 shown in FIG. 2.

A control unit 301 is configured by appropriately using an icon extracting unit 322, a direction application starting unit 324, a direction calculating unit 325, a direction comparing unit 326, a tilt calculating unit 327, and a tilt comparing unit 328, and controls, based on an instruction(s) from the user interface unit 308, a memory unit 302, a position information acquiring unit 303, a height information acquiring unit 309, a housing direction detecting unit 305, a housing tilt detecting unit 310, a near field communication unit 312, and a LAN communication unit 313, etc. to carry out: registration of the electric equipment 3 before using the remote controller; selection of the electric equipment 3 in using the remote controller; and remote control.

The user interface unit 308 presents various pieces of information to the user through, for example, the display device 208 or audio output device 210, etc. shown in FIG. 2, and transmits, to the control unit 301, the user's instructions from the operation device 207, video input device 209, and audio input device 211, etc.

The position information acquiring unit 303 acquires position information through, for example, the GPS receiver 203, acceleration sensor 205, and LAN communication device 213, etc. shown in FIG. 2. The height information acquiring unit 309 acquires height information through, for example, the acceleration sensor 205, and atmospheric pressure sensor 215, etc. shown in FIG. 2. The housing direction detecting unit 305 detects a direction of the housing through, for example, the geomagnetism sensor 204, and gyro sensor 206, etc. shown in FIG. 2. The housing tilt detecting unit 310 detects a tilt of the housing through, for example, the acceleration sensor 205, and gyro sensor 206, etc. shown in FIG. 2. Incidentally, the position information, height information, direction, and tilt may be detected by using other sensors or using both of the above sensors and the other sensors.

For example, since acquisition of the height information through the acceleration sensor 205, and atmospheric pressure sensor 215, etc. is affected by a circumferential environment, an altitude value on the basis of a sea level is difficult to obtain with high accuracy. However, in this embodiment, even when an altitude value is not obtained, it is sufficient if a relative height difference between the terminal device 1 and the electric equipment 3 can be detected. By correcting any of two pieces of height information that have been acquired before and after a change in the circumferential environment, the relative height difference can be detected without being affected by the change in the circumferential environment. Therefore, the height information acquiring unit 309 of this embodiment can detect the height information to be need. Incidentally, a piece of electric equipment such as an indoor unit of an air conditioner has a height of about 2 m above a floor surface in many cases, so that the electric equipment 3 has a predetermined default value(s) as the height information, and the value may be supplied to the terminal device 1.

The near field communication unit 312 is moved closer to a near field communication unit provided in the electric equipment 3 and then starts near field communication therewith, thereby being able to input/output various data into/from the electric equipment 3. Or, the near field communication unit 312 is moved closer to an NFC tag etc. and then starts near field communication therewith, thereby being able to input various data from the NFC tag.

Before use of the remote controller, the control unit 301 acquires information necessary for remote-controlling the electric equipment 3, and records/registers the acquired information in the memory unit 302. The control unit 301 first acquires: identification information indicative of a type, a model name, and a serial number, etc. of the electric equipment 3; an icon (display image); an URL for a remote control application(s); and the like through the near field communication unit 312, and stores them in an identification information list 334 and an icon list 332 of the memory unit 302. At the same time, the control unit 301 acquires position information on the electric equipment 3 through the position information acquiring unit 303, and stores the acquired position information in a position information list 331 of the memory unit 302. The control unit 301 then acquires height information on the electric equipment 3 through the height information acquiring unit 309, and stores the acquired height information in a height information list 335 of the memory unit 302. When the height information on the electric equipment 3 is acquired, the control unit 301 reads the already registered height information on the electric equipment 3 out of the height information list 335, and calibrates the height information acquiring unit 309, thereby being able to detect, with high accuracy, the relative height difference on the basis of the registered height information on the electric equipment 3.

Incidentally, when the terminal device 1 is equipped with a camera, position information etc. of the electric equipment 3 to be targeted may be calculated from a distance and a direction between the terminal device 1 and the electric equipment 3 by a known measurement method using an image-capturing means. In such a case, the above camera is not limited to a monocular camera, may be a stereo camera in order to obtain a configuration with higher measurement accuracy.

Incidentally, a remote control application(s) is acquired from the network 5 through the LAN communication unit 313 in accordance with the above URL, and is stored in the application list 333 of the memory unit 302. Incidentally, the remote control application is application software for remote-controlling the electric equipment 3. In addition, a plurality of pieces of electric equipment 3 can be registered in the list in the memory unit 302, so that position information, height information, icons, and remote control application, etc. are registered in association with individual pieces of identification information.

Namely, when information necessary for remote-controlling the electric equipment 3 is registered before use of the remote controller, the identification information, icon, URL for the remote control application etc. are acquired through the near field communication (NFC). When the electric equipment 3 is present at a location difficult to make near field communication with the terminal device 1, the necessary information is acquired from an NFC tag put at a location described later. This makes acquisition of various pieces of information easier than a case where the user searches for and acquires various pieces of information through the LAN (Wi-Fi). Incidentally, a list of the acquired position information, and height information, etc. can be transmitted and received to and from a different terminal device (s) by a predetermined operation (s). This, for example, makes it possible to save all family members the trouble of individually acquiring information from each piece of electric equipment. In addition, there is a method of directly acquiring the remote control application by using the near field communication also in registering the application. In this case, however, use of the LAN facilities the registration of the remote control application, which is easy to have a large volume of data.

When the remote controller is used, the control unit 301 selects the electric equipment 3 to be remote-controlled from the pieces of electric equipment 3 registered in the memory unit 302. Firstly, the position information acquiring unit 303 acquires position information on the terminal device 1, and the direction calculating unit 325 compares the acquired position information with the position information on all the pieces of electric equipment 3 listed in the position information list 331 to calculate a direction (azimuth of the terminal device 1 to the electric equipment 3). At the same time, the height information acquiring unit 309 acquires height information, and the tilt calculating unit 327 compares the acquired height information with the position information on all the pieces of electric equipment 3 listed in the height information list 335 to calculate a tilt (elevation angle of the terminal device 1 to the electric equipment 3).

Subsequently, the housing direction detecting unit 305 detects a direction of the housing of the terminal device 1, and the direction comparing unit 326 compares the detected direction with the direction pointed to each piece of electric equipment 3 from the terminal device 1. At the same time, the housing tilt detecting unit 310 detects a tilt of the hosing of the terminal device 1, and the tilt comparing unit 328 compares the detected tilt with the tilt pointed to each piece of electric equipment 3 from the terminal device 1.

Subsequently, based on respective comparison results outputted from the direction comparing unit 326 and the tilt comparing unit 328, the icon extracting unit 322 extracts, from the icon list 332, an icon for electric equipment 3 put at a location of having the closest direction and tilt to the direction and tilt of the housing, and the extracted icon is displayed on the user interface unit 308.

If the icon displayed on the user interface unit 308 is an icon for the intended electric equipment 3, the user selects the icon, and the application starting unit 324 starts the remote control application corresponding to the selected icon from the application list 333. When the icon displayed on the user interface unit 308 is not the icon for the intended electric equipment 3, the user changes the direction and tilt of the housing of the terminal device 1 so that the icon for the intended electric equipment 3 is displayed on the user interface unit 308.

In this manner, the user can remote-control the intended electric equipment 3 by using the terminal device 1.

Figure 4:
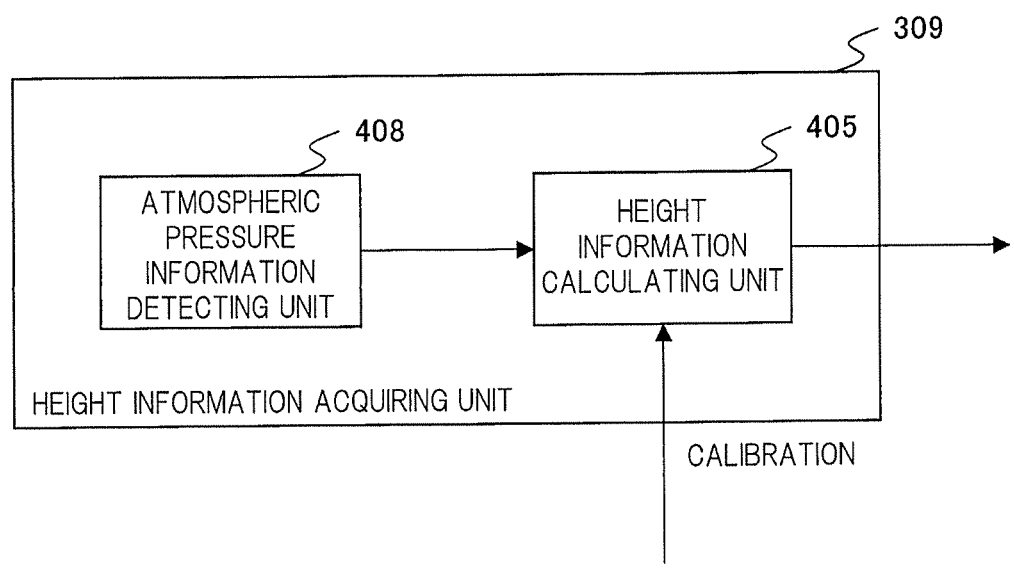
FIG. 4 is a functional block diagram of a height information acquiring unit of the terminal device according to the first embodiment of the present invention.

FIG. 4 is a functional block diagram of the height information acquiring unit of the terminal device according to the first embodiment of the present invention. The height information acquiring unit 309 is configured by appropriately using an atmospheric pressure information detecting unit 408 and a height information calculating unit 405.

The atmospheric pressure information detecting unit 408 measures atmosphere pressure information such as the ambient pressure and temperature, etc. of the terminal device 1 by using, for example, the atmospheric pressure sensor 215 and temperature sensor 216, etc. shown in FIG. 2, and sends the acquired atmospheric pressure information to the height information calculating unit 405.

The height information calculating unit 405 calculates an altitude value (s) based on the atmospheric pressure information detected by the atmospheric pressure information detecting unit 408, and calibrates the altitude value by using the height information listed in the height information list 335.

Figure 5:
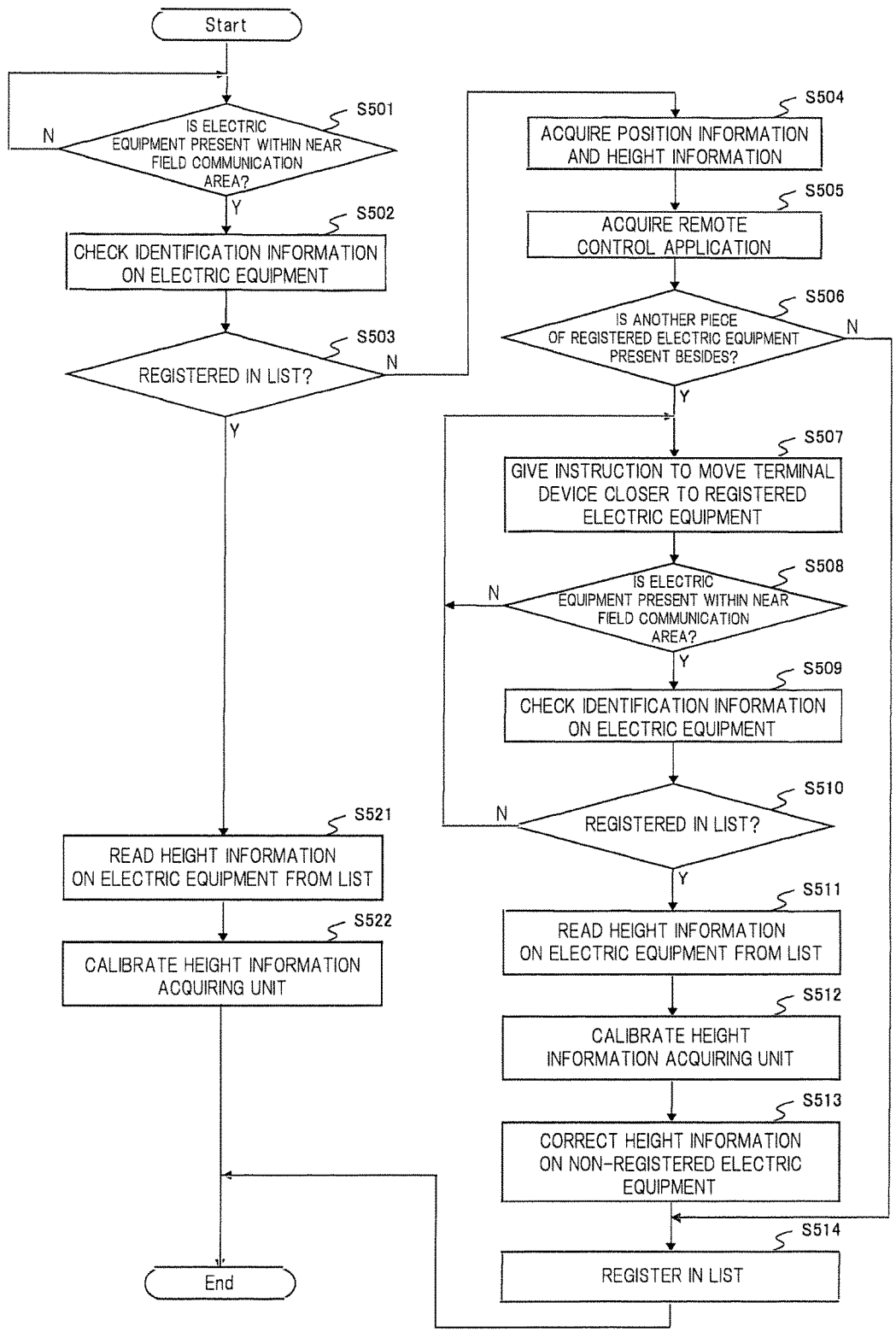
FIG. 5 is a flowchart for explaining an electric equipment registration processing according to the first embodiment of the present invention.

FIG. 5 is a flowchart for illustrating an electric equipment registration processing by the terminal device according to the first embodiment of the present invention. Before carrying out the remote control of the electric equipment 3, the terminal device 1 needs to register the electric equipment 3 in advance. This flowchart depicts, by a launcher application, a processing of registering the electric equipment 3 with the terminal device 1, and a processing of calibrating the terminal device 1.

Incidentally, in this embodiment, application software for calling a remote control application is referred to as a launcher application so as to distinguish such application software from the remote control application. According to this embodiment, the registration and calling of the remote control application are carried out through the launcher application.

According to this embodiment, the user can carry out the registration processing by merely moving the terminal device 1 closer to the electric equipment 3.

At step S501, the terminal device 1 causes the near field communication unit 312 to check whether the electric equipment 3 is present within a communication area of the near field communication. When the electric equipment 3 is present within the communication area, the terminal device 1 starts the launcher application, obtains various pieces of information necessary for remote-controlling the electric equipment 3, and registers the electric equipment 3 with the terminal device 1.

Firstly, at step S502, the identification information on the electric equipment 3 is checked.

Subsequently, at step 503, the terminal device 1 checks whether the electric equipment 3 is already registered with the list stored in the memory unit 302. If the identification information on the electric equipment 3 exists in the identification information list 334, it has been already registered. If the identification information on the electric equipment 3 does not exist in the identification information list 334, it is not registered yet. When the electric equipment 3 has been already registered in the list, the terminal device 1 proceeds to step S521. When the electric equipment 3 has not been registered in the list yet, the terminal device 1 proceeds to step S504.

At step S504, the position information acquiring unit 303 and the height information acquiring unit 309 acquire the current position information and height information on the terminal device 1. At this time, the electric equipment 3 is within the communication area capable of making near field communication with the terminal device 1, so that the location of the electric equipment 3 can be considered to be similar to the location of the terminal device 1. Therefore, the acquired position information and height information on the terminal device 1 is regarded as position information and height information on the electric equipment 3.

Subsequently, at step S505, the terminal device 1 acquires a remote control application for the electric equipment 3. The remote control application may be acquired from the Internet network via the wireless router 4 and network 5 in accordance with a URL (Uniform Resource Locator) specified by the electric equipment 3 instead of direct acquisition from the electric equipment 3. The terminal device 1 may also acquire product information etc.

Subsequently, at step S506, the terminal device 1 checks whether other pieces of electric equipment 3 registered in the list is present. When the other pieces of electric equipment 3 registered exist, the terminal device 1 proceeds to step S507. When the other pieces of electric equipment 3 do not exist, the terminal device 1 proceeds to step S514.

At step S507, the terminal device 1 gives an instruction to move the terminal device 1 closer to the other registered pieces of electric equipment 3. At step S508, the terminal device 1 waits until it is confirmed that the other pieces of electric equipment 3 is present within the communication area of the near field communication. When it is confirmed that the electric equipment 3 is present within the communication area, the terminal device 1 proceeds to step S509, and checks identification information. Then, at step S510, the terminal device 1 checks whether the confirmed electric equipment 3 is already registered in the list. When the confirmed electric equipment 3 has been already registered in the list, the terminal device 1 proceeds to step S511. When the confirmed electric equipment 3 has not been registered in the list yet, the terminal device 1 returns to step S507, and continues those processings.

At step S511, height information on the electric equipment 3 is read from the height information list 335. At step S512, the atmospheric pressure information detecting unit 408 of the height information acquiring unit 309 detects atmospheric pressure information, and the height information calculating unit 405 calculates height information. A difference between the calculated height information and the height information read from the height information list 335 is then found, and the height information calculating unit 405 of the height information acquiring unit 309 is calibrated to eliminate the difference.

For example, in a case of acquiring height information by an atmospheric pressure sensor, there is a possibility of being unable to acquire accurate height information due to a fluctuation of the atmospheric pressure depending on the date/time and temperature even if the atmospheric pressure sensor can measure an exact atmospheric pressure. Therefore, an atmospheric pressure is measured at a location of another piece of electric equipment 3 (having acquired the height information previously) registered in the list to reacquire the height information, and by correction based on a difference therebetween, the accurate height information can be acquired.

Subsequently, at step S513, height information on the non-registered electric equipment 3 acquired at step S504 is corrected with a difference value calculated at step S512.

Subsequently, at step S514, the terminal device 1 registers the acquired identification information, remote control application, position information, height information, and product information, etc. of the electric equipment 3 in the lists of the memory unit 302, and ends those processings.

Incidentally, when the electric equipment 3 is put at a high place such as an installed place of illumination equipment or an air conditioner, moving the terminal device 1 closer to the electric equipment 3 is difficult, so that the terminal device 1 is moved closer not to the electric equipment 3 but to the NFC tag to register the electric equipment 3. For example, it is considered that: an NFC tag seal having various pieces of information recoded therein is pasted on an instruction manual for the electric equipment 3 or on the remote controller 2; and the terminal device 1 is moved closer to the NFC tag directly below the electric equipment 3 to register the electric equipment 3. In the case of using the NFC tag, the height information on the electric equipment 3 may be registered by, for example, adding 1 m to the height information on the terminal device 1.

In addition, at step S503, when the electric equipment 3 has been already registered in the list, the terminal device 1 proceeds to steps S512 and S522, and similarly to the processings at steps S511 and S512, the terminal device 1 calibrates the height information calculating unit 405 of the height information acquiring unit 309, and ends the processings. Instead of ending the processing, the terminal device 1 may start the remote control application for the electric equipment 3.

In this manner, by using the terminal device 1, the user can carry out the registration processing for remote-controlling the electric equipment 3. The user can also carry out the calibration before the remote control.

Figure 6:
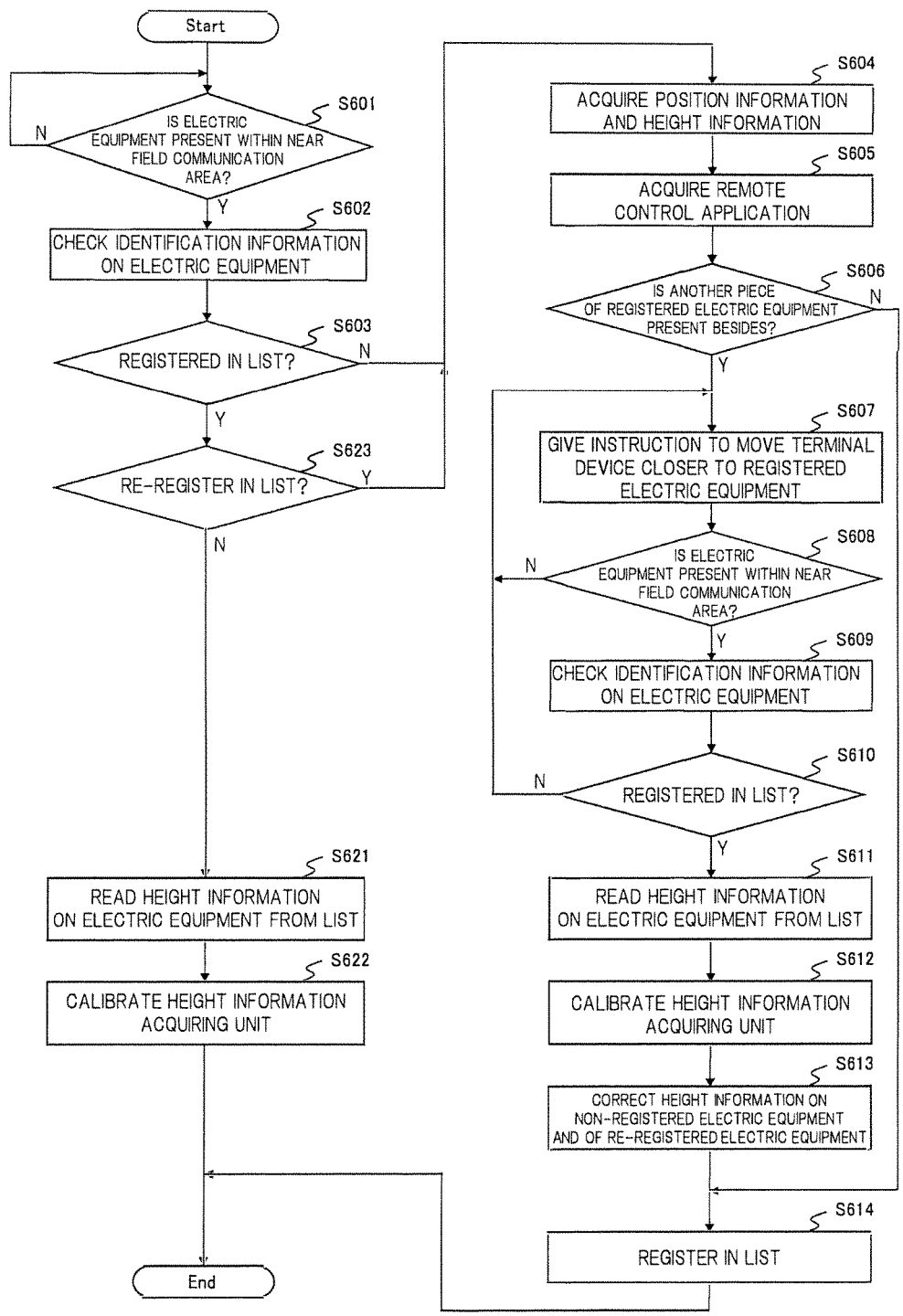
FIG. 6 is a flowchart showing a modification in which a re-registration check processing is added to the registration processing shown in FIG. 5.

FIG. 6 is a flowchart showing a modification in which a re-registration check processing is added to the registration processing illustrated in FIG. 5.

Steps S601 and S602 have the same processings as steps S501 and S502, and at these steps, the terminal device 1 checks the identification information on the electric equipment 3 moved closer to the terminal device 1 by the user.

Subsequently, at step 603, the terminal device 1 checks whether the electric equipment 3 is already registered in the list stored in the memory unit 302. If the identification information on the electric equipment 3 exists in the identification information list 334, the electric equipment 3 is already registered. If the identification information on the electric equipment 3 does not exist in the identification information list 334, the electric equipment 3 is not registered yet. When the electric equipment 3 has been already registered in the list, the terminal device 1 proceeds to step S623. When the electric equipment 3 has not been registered in the list yet, the terminal device 1 proceeds to step S604.

At step S623, the terminal device 1 checks whether or not to re-register the electric equipment 3 in the list. In re-registering the electric equipment 3 in the list, the terminal device 1 proceeds to step S604, and registers position information, and height information, etc. again. Re-registering the electric equipment 3 in the list becomes necessary when, for example, the location of installation of the electric equipment 3 is changed. In this case, a message asking whether or not to re-register the electric equipment 3 may be displayed on the user interface unit 308. When the user has an intention of the re-registration from the beginning, a mode for the re-registration may be provided separately so that the registration processing is started from step S604 at a time of the above mode.

Steps S604 to S614 have the same processings as steps S504 to S514, and at these steps, various pieces of information necessary for remote-controlling the electric equipment 3 are acquired to register the electric equipment 3 with the terminal device 1. The description of steps S504 to S514 is employed as details of steps S604 to S614, and therefore the details will be omitted.

Incidentally, when the electric equipment 3 is not re-registered in the list at step S623, the terminal device 1 proceeds to steps S621 and S622, calibrates the height information calculating unit 405 of the height information acquiring unit 309 similarly to steps S521 and S522, and ends the registration processing. Incidentally, instead of ending the processing, the terminal device 1 may start the remote control application for the electric equipment 3.

In this manner, by using the terminal device 1, the user can carry out the registration processing for remote-controlling the electric equipment 3. It can also carryout the calibration before the remote control. In addition, when the electric equipment 3 is shifted, the user can carryout the registration processing again.

Figure 7:
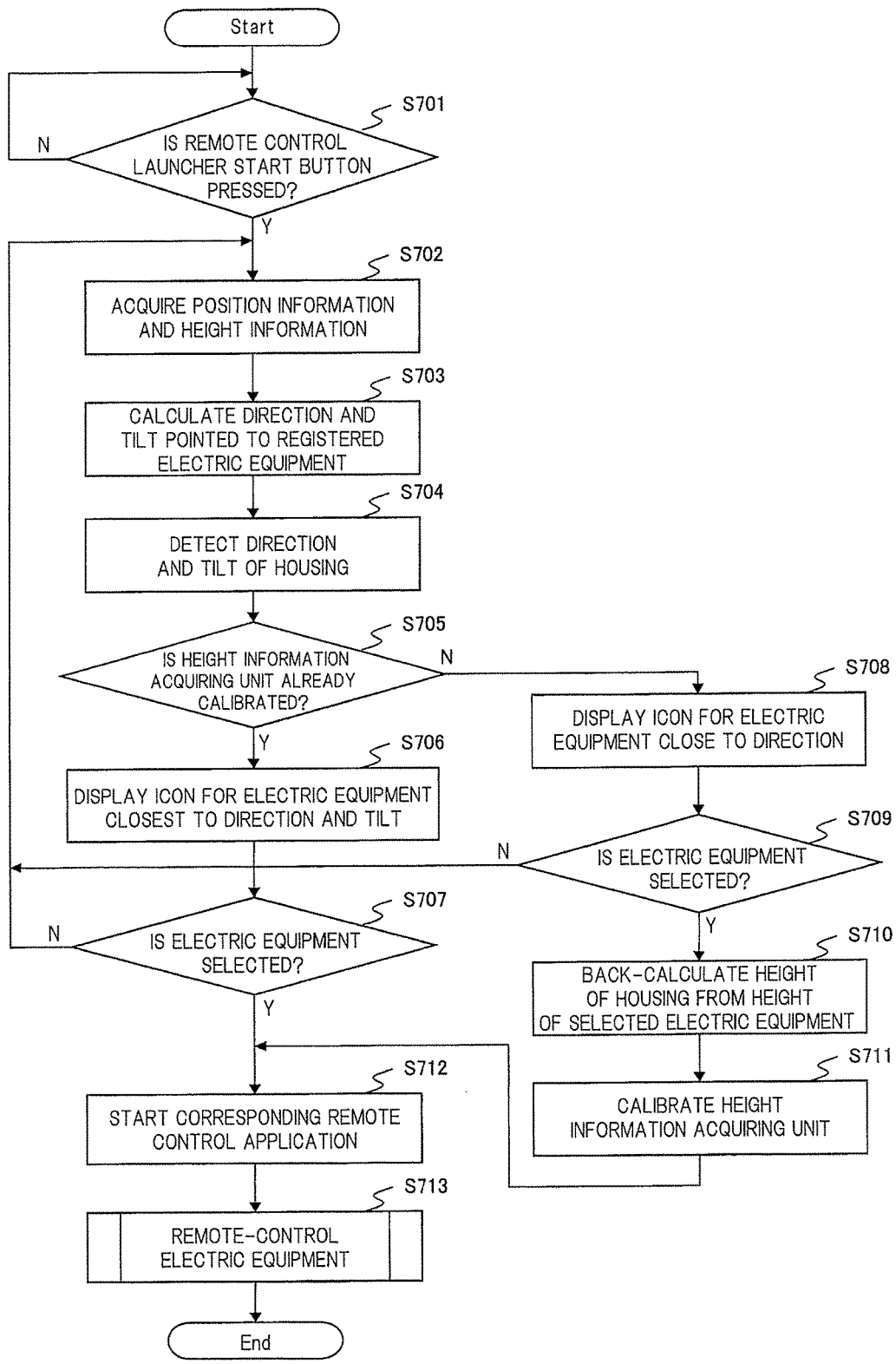
FIG. 7 is a flowchart for explaining an electric equipment selection processing according to the first embodiment of the present invention.

FIG. 7 is a flowchart for showing an electric equipment selection processing by the terminal device according to the first embodiment of the present invention. This flowchart depicts a processing of selecting an intended remote control application by the launcher application.

At step S701, the terminal device 1 waits for the user's pressing a remote control launcher start button. The remote control launcher start button may be provided as, for example, a physical switch such as a home button of the terminal device 1, or may be provided as an icon on the touch panel. When the terminal device 1 is a wearable smart glass etc., the remote control launcher application may be configured to be started by a vocal instruction (s).

Figure 8A:
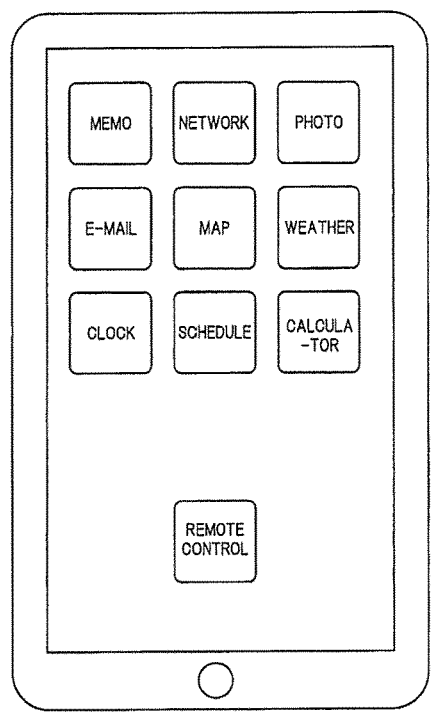
FIG. 8A depicts a display example of a touch panel of the terminal device according to the first embodiment of the present invention.
Figure 8B:
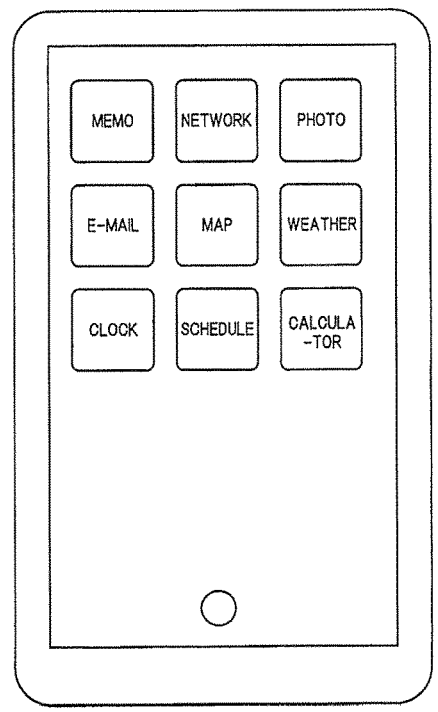
FIG. 8B depicts a display example of a touch panel of the terminal device according to the first embodiment of the present invention.

FIGS. 8A and 8B depict display examples of the touch panel of the terminal device according to the first embodiment of the present invention. FIG. 8A depicts an example of a home screen of the terminal device 1, and a "remote control" launcher icon is displayed among various application icons displayed on the touch panel. The user's touching this icon is equivalent to the user's pressing the remote control launcher start button. Incidentally, the terminal device 1 may be configured so as to display the "remote control" launcher icon as shown in FIG. 8A only in user's home, and not to display the "remote control" launcher icon as shown in FIG. 8B outside the home. By this configuration, even if the user inadvertently touches the "remote control" launcher icon outside the home, the remote control launcher application is not started. Or, the terminal device 1 may be configured so as to display the "remote control" launcher icon as shown in FIG. 8A even outside the user's home, and so as to be able to remote-control the electric equipment 3 from outside the home. Whether the terminal device 1 is in or outside the home can be confirmed by, for example, checking whether the terminal device 1 is within the communication area of the wireless router 4. Or, it can be also checked from the position information based on the GPS etc.

When the remote control launcher start button is pressed, the control unit 301 starts the launcher application, and selects and starts a remote control application.

Firstly, the selection processing proceeds to step S702, and the control unit 301 causes the position information acquiring unit 303 and the height information acquiring unit 309 to acquire position information and height information on the terminal device 1, respectively. The acquired position information and height information indicate the current location and height of the terminal device 1 at the timing of the remote control start button being pressed.

Subsequently, at step S703, directions and tilts pointed to all the pieces of registered electric equipment 3 from the terminal device 1 are calculated. The directions and tilts pointed to all the pieces of electric equipment 3 from the terminal device 1 are found from the position information and height information on the electric equipment 3 registered in the position information list 331 and the height information list 335 and from the current position information and height information on the terminal device 1 acquired by the position information acquiring unit 303 and the height information acquiring unit 309.

For example, it is assumed that the video monitor 3c1 is located at latitude 35.6586580 degrees and longitude 139.745433 degrees and the air conditioner 3b1 at latitude 35.6586580 degrees and longitude 139.745423 degrees. If the terminal device 1 is located at latitude 35.6586570 degrees and longitude 139.745433 degrees, the video monitor 3c1 and the air conditioner 3b1 located as described above have at the same latitude as the terminal device 1, and the video monitor 3c1 has at the same longitude as the terminal device 1. Therefore, the direction pointed to the video monitor 3c1 from the terminal device 1 becomes north (azimuth of 0°), and the direction pointed to the air conditioner 3b1 from the terminal device 1 becomes northwest (azimuth of 315°). In addition, a distance between the terminal device 1 and the video monitor 3c1 is about 1 m, a distance between the video monitor 3c1 and the air conditioner 3b1 is about 1 m, and a distance between the terminal device 1 and the air conditioner 3b1 is about 1.4 m.

For example, if the terminal device 1 is held at the same height at which the video monitor 3c1 is located and if the air conditioner 3b1 is further located a height of 2.5 m above them, the tilt pointed to the video monitor 3c1 from the terminal device 1 becomes horizontal (elevation angle of 0°) and the tilt pointed to the air conditioner 3b1 from the terminal device 1 becomes diagonally upward (elevation angle of 60°). Incidentally, here, when the illumination equipment 3a etc. exemplified as the electric equipment 3 are placed at a predetermined location, the illumination equipment 3a etc. are expressed as illumination equipment 3a1 etc.

Subsequently, at step S704, the housing direction detecting unit 305 and the housing tilt detecting unit 310 detect the direction and tilt of the housing of the terminal device 1. The terminal device 1 is directed at the electric equipment 3 to be remote-controlled.

Figure 9A:
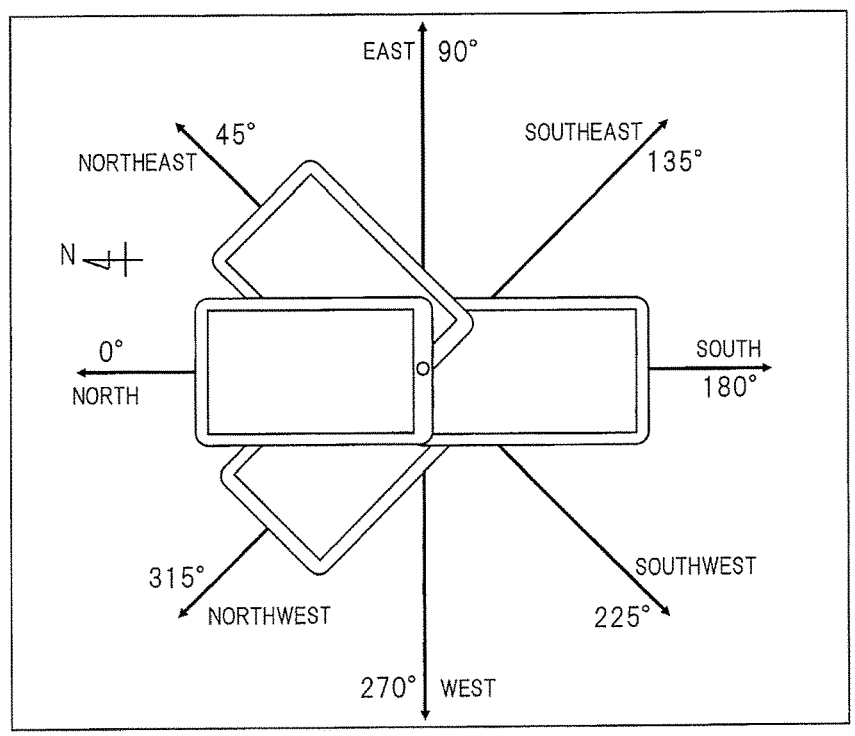
FIG. 9A is a diagram showing directions of the housing of a terminal device according to the first embodiment of the present invention.
Figure 9B:
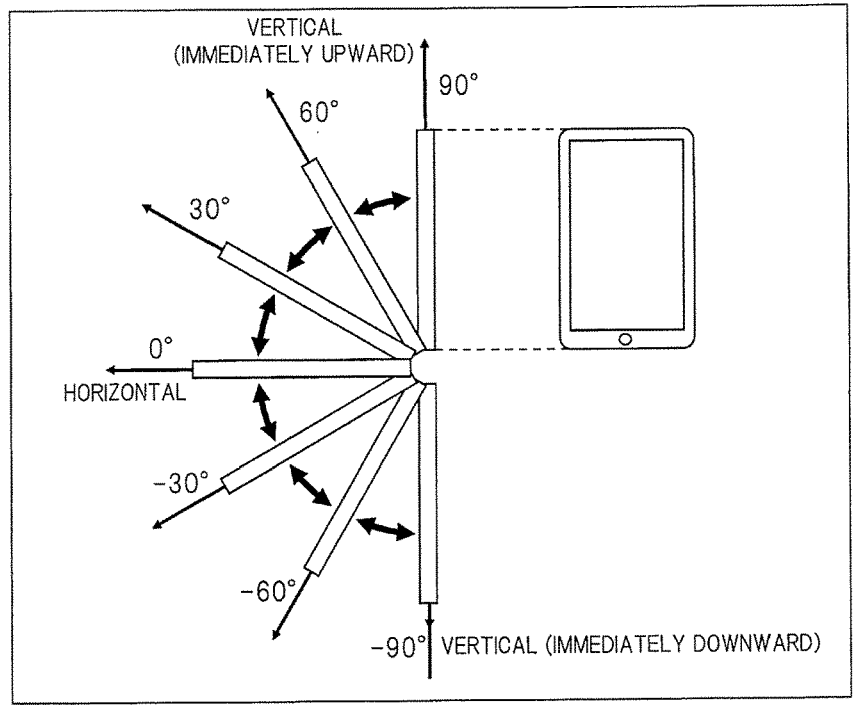
FIG. 9B is a diagram showing tilts of the housing of a terminal device according to the first embodiment of the present invention.

FIGS. 9A and 9B are conceptual diagrams showing directions, azimuths, tilts, and elevation angels of the housing of the terminal device according to the first embodiment of the present invention. FIG. 9A is a conceptual diagram showing directions and azimuths of the housing of the terminal device 1. A relationship between the directions and the azimuths is defined so that if it is assumed that north is equivalent to 0°, northeast is 45°, east is 90°, southeast is 135°, south is 180°, southwest is 225°, west is 270°, and northwest is 315°. FIG. 9B is a conceptual diagram showing tilts and elevation angles of the housing of the terminal device 1. The tilts and elevation angles are mutually defined so that it is assumed that horizontal direction is an elevation angle of 0°, a vertical (immediately upward) direction is 90°, and a vertical (immediately downward) direction is –90°. For example, when the electric equipment 3 is present at an extension of an arrow indicating an angle of 30° in a diagonally upward direction of FIG. 9B, the tile (elevation angle) pointed to the electric equipment 3 from the terminal device 1 is 30°. When the tilt (elevation angle) of the hosing of the terminal device 1 is close to 30°, the tilt (elevation angle) of pointed to the electric equipment 3 matches the tilt of the hosing.

Subsequently, at step S705, the terminal device 1 switches a flow of the selection processing depending on whether the height information acquiring unit is already calibrated or not. When the height information acquiring unit is already calibrated, the terminal device 1 proceeds to step S706. When the height information acquiring unit is not calibrated yet, the terminal device 1 proceeds to step S708.

Being already calibrated means, for example, a case where a preset predetermined time has not passed from the previous calibration, a case where a change in an atmospheric pressure or temperature value does not exceed a preset value, a case where the acquired height information is normal, or the like. Being not calibrated yet means, for example, a case of newly carrying out the calibration, a case where the preset predetermined time has passed the previous calibration, a case where a change in an atmospheric pressure or temperature value has exceed the preset value, a case where the acquired height information is not normal, or the like. For example, when it is assumed that a height of the room's floor is 0 m and that of the ceiling is 3 m, the height information can be determined not to be normal if the acquired height information falls outside a height range of 0 m to 3 m.

When the height information acquiring unit is already calibrated, the terminal device 1 proceeds to step S706, and the control unit 301 displays, on the user interface unit 308, an icon for such electric equipment 3 that the direction and tilt calculated at step S704 are closest to the direction and tilt of the housing of the terminal device 1.

For example, when the electric equipment 3 is present at an extension of a 45° angle arrow of FIG. 9A, a direction pointed to the electric equipment 3 from the terminal device 1 becomes northeast (azimuth of 45°). When a direction of the hosing of the terminal device 1 is close to northeast (azimuth of 45°), the direction (azimuth) pointed to the electric equipment 3 matches the direction of the hosing of the terminal device 1.

Incidentally, for example, when it is assumed that the direction (azimuth) pointed to the electric equipment 3 from the terminal device 1 is denoted as "a", the tilt (elevation angle) pointed to the electric equipment 3 from the terminal device 1 is denoted as "c", the direction (azimuth) of the hosing of the terminal device 1 is denoted as "b", and the tilt (elevation angle) of the housing is denoted as "d", $X=(a-b)^2+(c-d)^2$ is calculated and by obtaining the electric equipment 3 having the smallest X, such electric equipment 3 as to be closest to the direction and tilt of the housing of the terminal device 1 can be identified. At this time, a difference in the direction or a difference in the tilt may be weighted to give priority to either the direction or tilt. In addition, history information (date/time information etc.) of an operation object to be remote-controlled may be recorded to give priority to the electric equipment 3 that is used more frequently. For example, a level of priority to the electric equipment may be changed based on the frequency in use depending on each time zone such as morning, daytime, and nighttime.

FIGS. 10A to 10D depict display examples of the touch panel of the terminal device 1 according to the first embodiment of the present invention.

Figure 10A:
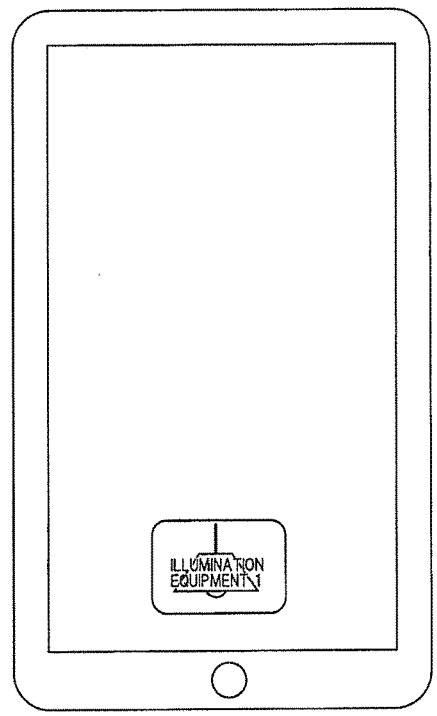
FIG. 10A depicts a display example of a touch panel of the terminal device according to the first embodiment of the present invention.

FIG. 10A depicts a display example of the touch panel in a case of directing the terminal device 1 at the illumination equipment 3a1. The touch panel displays the icon for the illumination equipment 3a1, and such display indicates that the illumination equipment 3a1 is present in a direction defined by the direction and tilt to which the terminal device 1 is pointed.

Figure 10B:
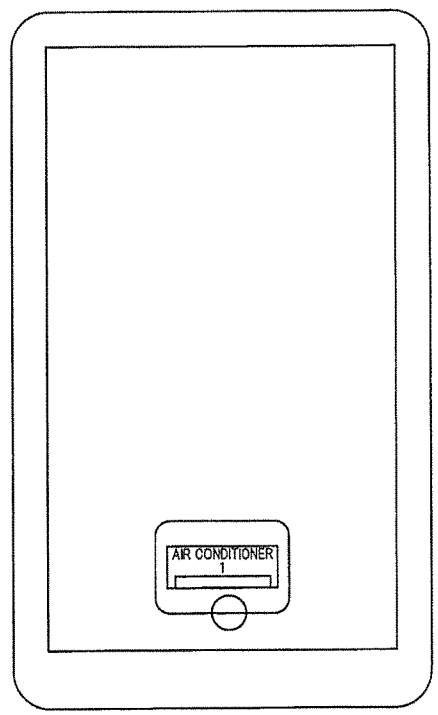
FIG. 10B depicts a display example of a touch panel of the terminal device according to the first embodiment of the present invention.

FIG. 10B depicts a display example of the touch panel in a case of directing the terminal device 1 at the air conditioner 3b1. The touch panel displays the icon for the air conditioner, and such display indicates that the air conditioner 3b1 is present in a direction defined by the direction and tilt to which the terminal device 1 is pointed.

Figure 10C:
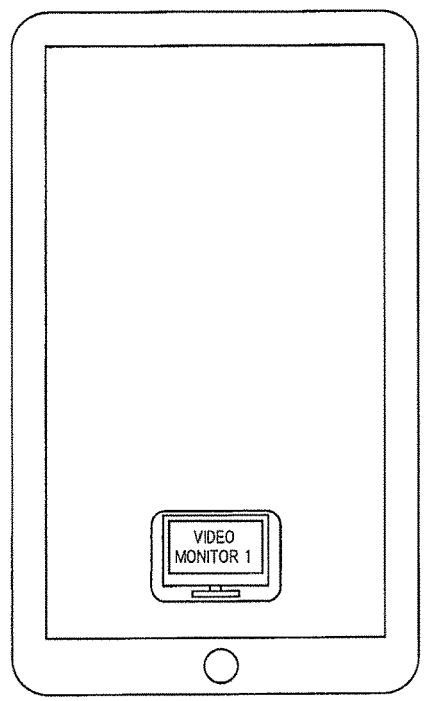
FIG. 10C depicts a display example of a touch panel of the terminal device according to the first embodiment of the present invention.

FIG. 10C depicts a display example of the touch panel in a case of directing the terminal device 1 at the video monitor 3c1. The touch panel displays the icon for the video monitor, and such display indicates that the video monitor 3c1 is present in a direction defined by the direction and tilt to which the terminal device 1 is pointed.

Figure 10D:
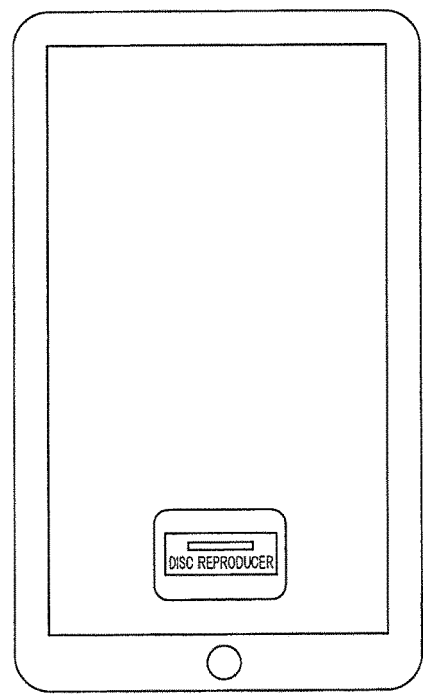
FIG. 10D depicts a display example of a touch panel of the terminal device according to the first embodiment of the present invention.

FIG. 10D depicts a display example of the touch panel in a case of directing the terminal device 1 at the disc reproducer 3d1. The touch panel displays the icon for the disc reproducer, and such display indicates that the disc reproducer 3d1 is present in a direction defined by the direction and tilt to which the terminal device 1 is pointed.

Incidentally, here, illustrated is the example in which each icon is displayed at a lower part of a screen. The location of the icon is, however, not limited to the lower part of the screen, and may be displayed on an upper or central part of the screen or displayed superimposedly. In addition to the display of only one icon, an icon for electric equipment 3 having the second-closest direction and tilt to the terminal device 1 may be further displayed on the left, right, top, or bottom of the icon. Such display makes it easier to find the icon for the intended electric equipment 3. Or, in addition to displaying of the icon for the electric equipment 3 having the closest direction and tilt to the direction and tilt of the housing, an icon for such electric equipment 3 that a difference between the directions falls within a predetermined range (e.g., azimuth of ±45°) or a difference between the tilts falls within a predetermined range (e.g., elevation angle of ±45°) may also be displayed on the left, right, top or bottom of the icon. Or, icons for several pieces of such electric equipment 3 as to be close to the direction and tilt of the housing may also be displayed. By displaying the icons in this manner, icons for pieces of electric equipment 3 having entirely different directions are eliminated, which makes it easier to find the icon for the intended electric equipment 3.

Incidentally, even in the case where the terminal device 1 is wearable smart glasses etc., its icon may also be displayed similarly. Particularly in the case of the smart glasses, however, the user's eyes are directed at the electric equipment 3 as an operation object to be remote-controlled. Therefore, the user may be informed, by merely blinking display etc., that the electric equipment 3 pointing the user's eyes is a candidate as an operation object to be remote-controlled, or informed, by not such display but voice, of the electric equipment which becomes a candidate as an operation object to be remote-controlled.

By touching the icon displayed on the touch panel or by giving, through voice, an instruction(s) to carry out a remote control operation, the remote control application for the intended electric equipment 3 is started, which makes it possible to remote control the intended electric equipment 3.

Figure 11A:
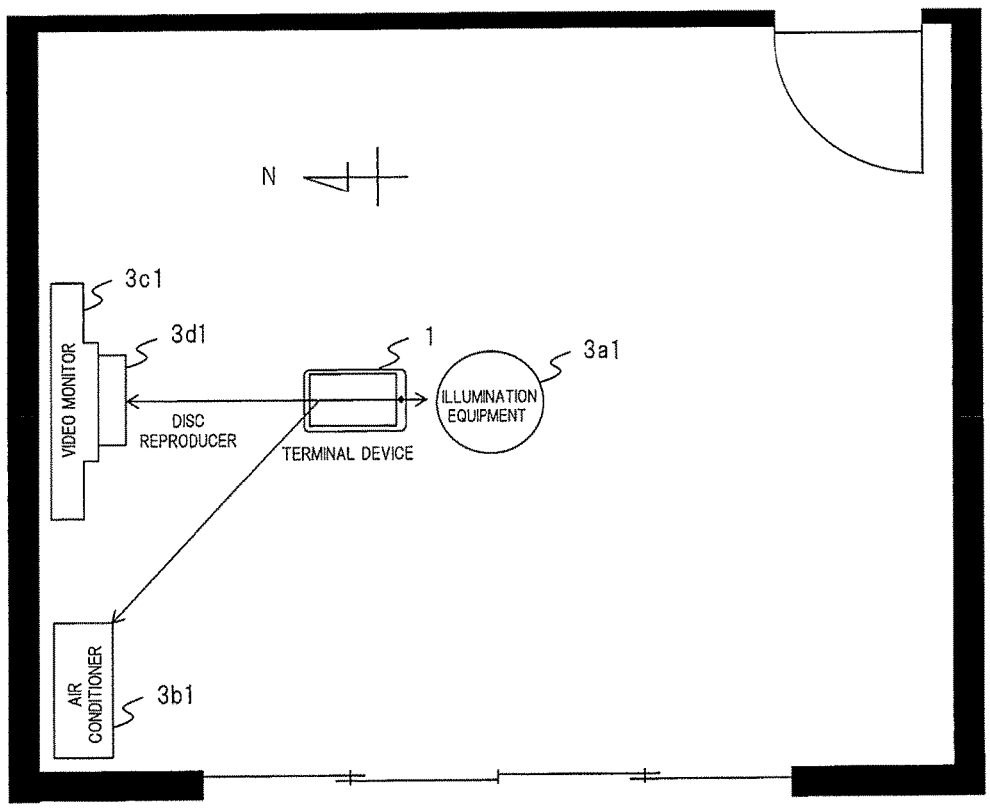
FIG. 11A is an arrangement view showing a room layout and electric equipment according to the first embodiment of the present invention.
Figure 11B:
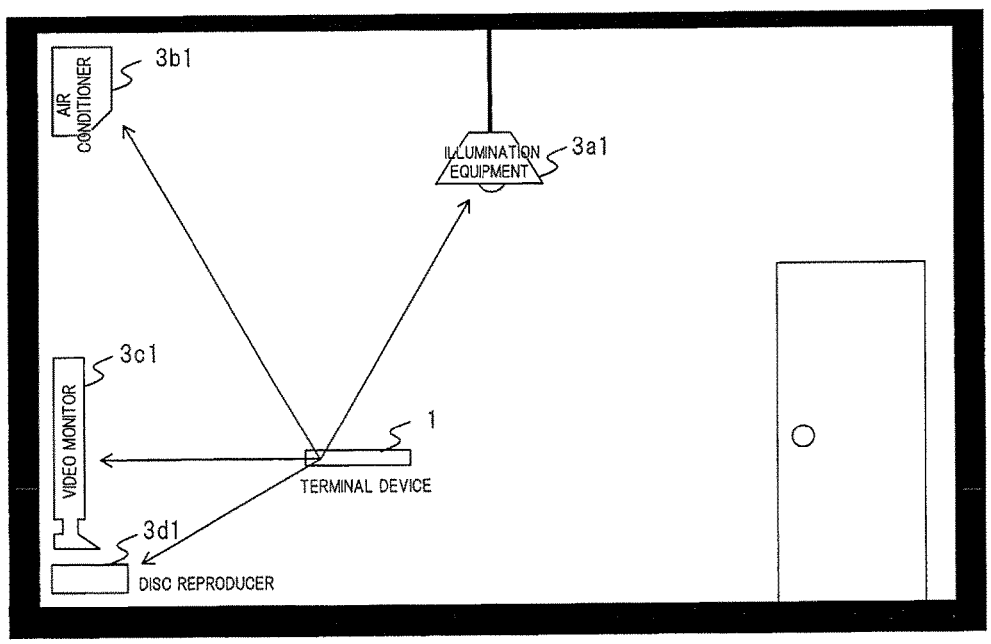
FIG. 11B is an arrangement view showing a room layout and electric equipment according to the first embodiment of the present invention.
Figure 12A:
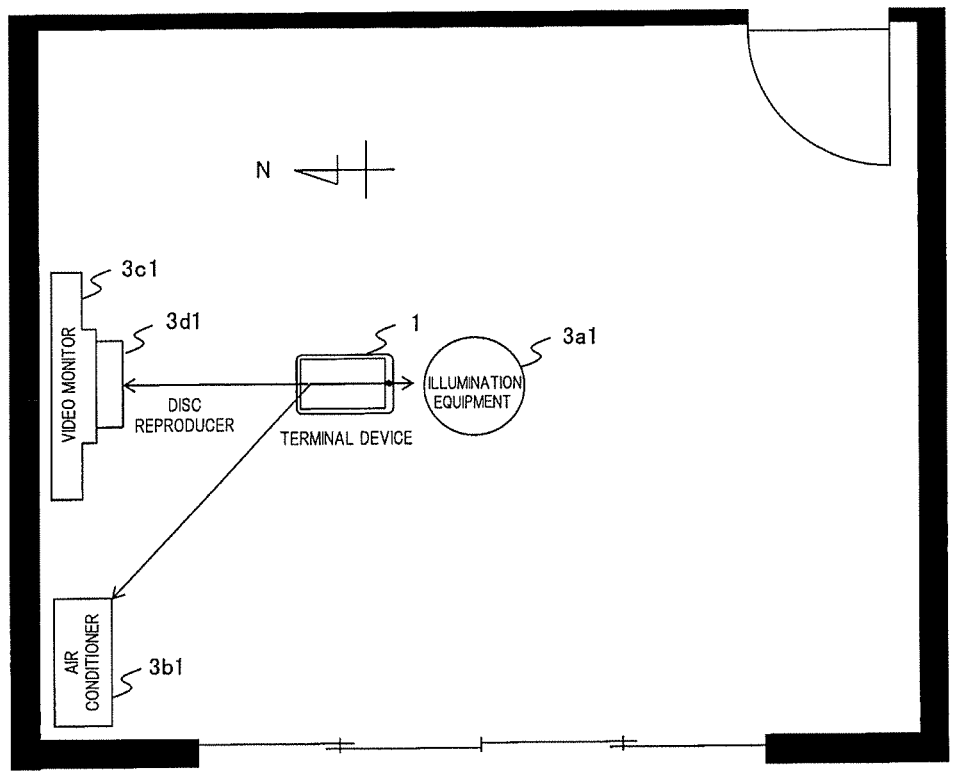
FIG. 12A is an arrangement view showing a room layout and electric equipment according to the first embodiment of the present invention.
Figure 12B:
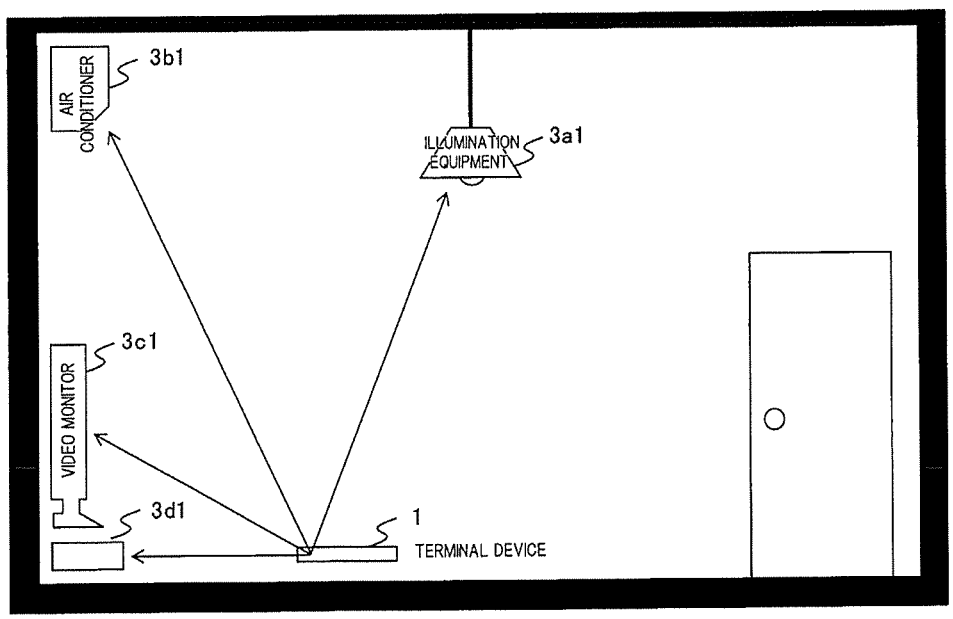
FIG. 12B is an arrangement view showing a room layout and electric equipment according to the first embodiment of the present invention.
Figure 13A:
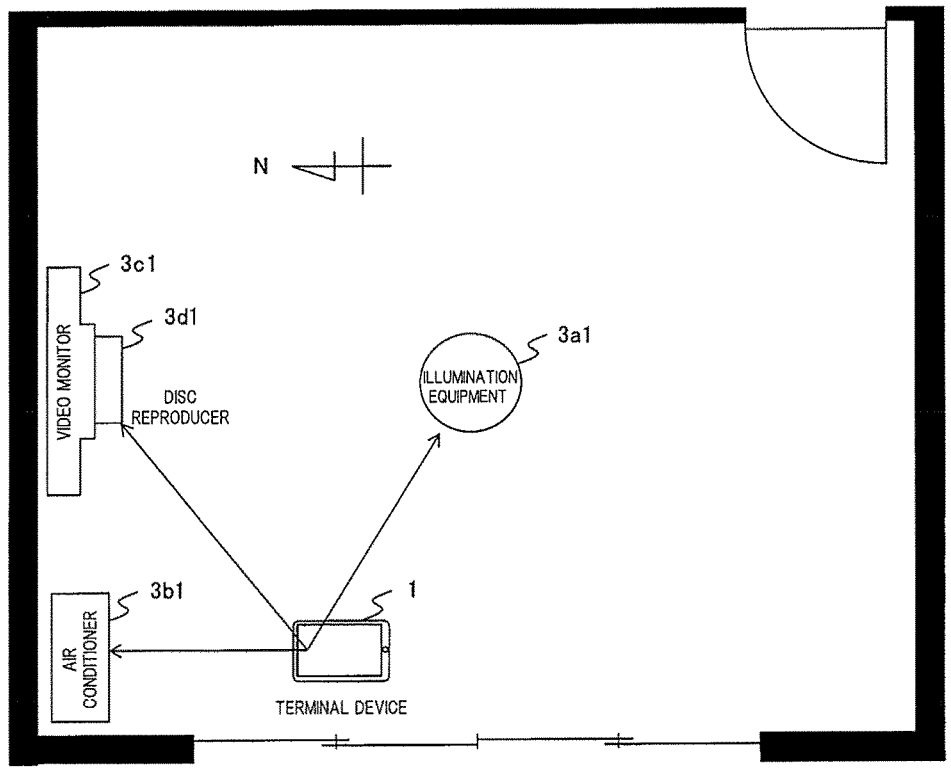
FIG. 13A is an arrangement view showing a room layout and electric equipment according to the first embodiment of the present invention.
Figure 13B:
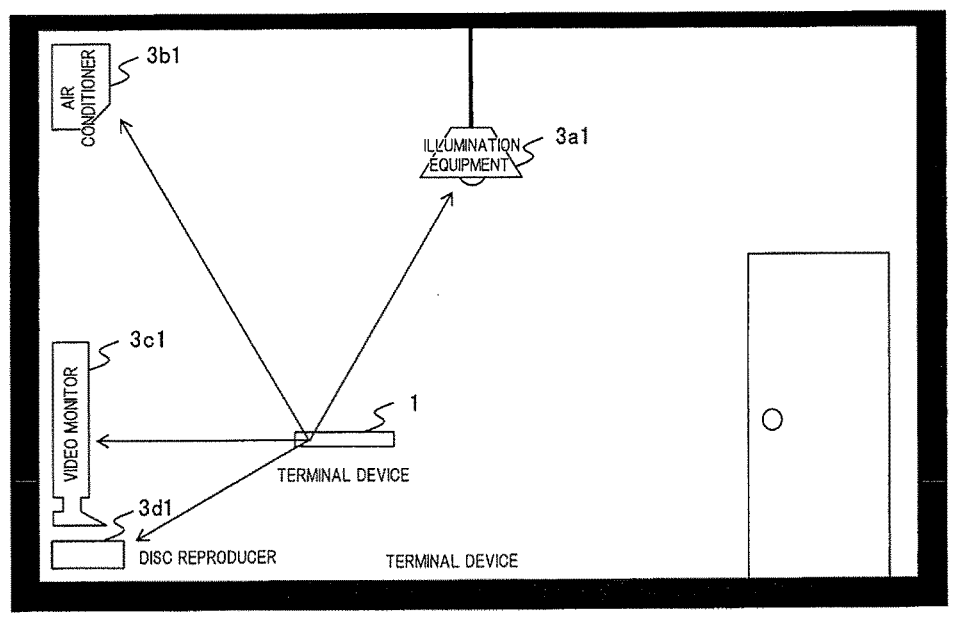
FIG. 13B is an arrangement view showing a room layout and electric equipment according to the first embodiment of the present invention.

FIGS. 11, 12, and 13 each depict arrangement examples of a room layout, a terminal device, and electric equipment in the room according to the first embodiment of the present invention. FIGS. 11A, 12A, and 13A are views seen from just above the room, and FIGS. 11B, 12B, and 13B are views seen from just beside the room. The room is furnished with the illumination equipment 3a1, the air conditioner 3b1, the video monitor 3c1, and the disc reproducer 3d1. The user selects any one of these pieces of electric equipment 3 and remote-controls the selected electric equipment 3.

FIGS. 11A and 11B, FIGS. 12A and 12B, and FIGS. 13A and 13B have the same arrangement of the room layout and the electric equipment 3, but are different in location (latitude/longitude) and height of the terminal device 1. FIGS. 11A and 11B are examples in which the terminal device 1 is located in front of the video monitor 3c1. FIGS. 12A and 12B are examples in which the terminal device 1 is located in front of the disc reproducer 3d1. Cases of FIGS. 11A and 11B and cases of FIGS. 12A and 12B are identical in the location (latitude/longitude) of the terminal device 1, but are different from each other in the height of the terminal device 1. The cases of FIGS. 11A and 11B and the cases of FIGS. 13A and 13B are identical in the height of the terminal device 1, but are different from each other in the location (latitude/longitude) of the terminal device 1.

In FIGS. 11A and 11B, a direction from the terminal device 1 to the illumination equipment 3a1 is south (azimuth of 180°), and a tilt (elevation angle) therebetween is 60°; a direction from it to the air conditioner 3b1 is northwest (azimuth of 315°), and a tilt (elevation angle) therebetween is 60°; a direction from it to the video monitor 3c1 is north (azimuth of 0°), and a tilt (elevation angle) therebetween is 0°; and a direction from it to the disc reproducer 3d1 is north (azimuth of 0°), and a tilt (elevation angle) therebetween is −30°.

When the terminal device 1 set at this location is operated, for example, the illumination equipment 3a1 can be selected if setting the direction of the housing of the terminal device 1 is set close to south (azimuth of 180°) and the tilt (elevation angle) of the housing is set close to 60°, and the air conditioner 3b1 can be selected if the direction of the housing of the terminal device 1 is set close to northwest (azimuth of 315°) and the tilt (elevation angle) of the housing is set close to 60°. Furthermore, if the direction of the housing of the terminal device 1 is set close to north (azimuth of 0°) and the tilt (elevation angle) of the housing is set close to 0°, the video monitor 3c1 can be selected, and if the direction of the housing of the terminal device 1 is set close to north (azimuth of 0°) and the tilt (elevation angle) of the housing is set close to −30°, the disc reproducer 3d1 can be selected.

In FIGS. 12A and 12B similarly to FIGS. 11A and 11B, the direction from the terminal device 1 to the illumination equipment 3a1 is south (azimuth of 180°) and a tilt (elevation angle) of therebetween is 70°; the direction from it to the air conditioner 3b1 is northwest (azimuth of 315°), and a tilt (elevation angle) therebetween is 70°; the direction from it to the video monitor 3c1 is north (azimuth of 0°), and a tilt (elevation angle) therebetween is 30°; and the direction from it to the disc reproducer 3d1 is north (azimuth of 0°), and a tilt (elevation angle) therebetween is 0°.

When the terminal device 1 set at this location is operated, for example, the illumination equipment 3a1 can be selected if the direction of the housing of the terminal device 1 is set close to south (azimuth of 180°) and the tilt (elevation angle) of the housing is set close to 70°, and the air conditioner 3b1 can be selected if the direction of the housing of the terminal device 1 is set close to northwest (azimuth of 315°) and the tilt (elevation angle) of the housing is set close to 70°. Furthermore, if the direction of the housing of the terminal device 1 is set close to north (azimuth of 0°) and the tilt (elevation angle) of the housing is set close to 30°, the video monitor 3c1 can be selected, and if the direction of the housing of the terminal device 1 is set close to north (azimuth of 0°) and the tilt (elevation angle) of the housing is set close to 0°, the disc reproducer 3d1 can be selected.

In FIGS. 13A and 13B, the direction from the terminal device 1 to the illumination equipment 3a1 is east south-east (azimuth of 120°), and a tilt (elevation angle) therebetween is 60°; the direction from it to the air conditioner 3b1 is north (azimuth of 0°), and a tilt (elevation angle) therebetween is 60°; the direction from it to the video monitor 3c1 is northeast (azimuth of 45°), and a tilt (elevation angle) therebetween is 0°; and the direction from it to the disc reproducer 3d1 is northeast (azimuth of 45°), and a tilt (elevation angle) therebetween is −30.

When the terminal device 1 set at this location is operated, for example, the illumination equipment 3a1 can be selected if the direction of the housing of the terminal device 1 is set close to east south-east (azimuth of 120°) and the tilt (elevation angle) of the housing is set close to 60°, and the air conditioner 3b1 can be selected if the direction of the housing of the terminal device 1 is set close to north (azimuth of 0°) and the tilt (elevation angle) of the housing is set close to 60°. Furthermore, if the direction of the housing of the terminal device 1 is set close to northeast (azimuth of 45°) and the tilt (elevation angle) of the housing is set close to 0°, the video monitor 3c1 can be selected, and if the direction of the housing of the terminal device 1 is set close to northeast (azimuth of 45°) and the tilt (elevation angle) of the housing is set close to −30°, the disc reproducer 3d1 can be selected.

Returning to FIG. 7, the description of the flowchart will be resumed.

Then, when the user selects electric equipment 3 to be remote-controlled at step S707, the terminal device 1 proceeds to step S712. If the user does not select the electric equipment 3, the terminal device 1 returns to step S702, and continues the selection processing.

When the height information acquiring unit is not calibrated yet at step S705, the terminal device 1 proceeds to step S708, and the control unit 301 displays, on the user interface unit 308 in order of height, icons for pieces of such electric equipment 3 that the direction calculated at step S704 is (within a predetermined area) close to the direction of the housing of the terminal device 1.

Figure 14A:
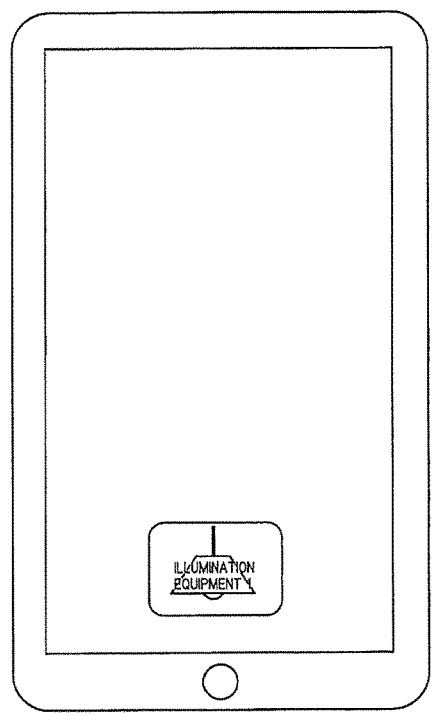
FIG. 14A depicts a display example of a touch panel of the terminal device according to the first embodiment of the present invention.
Figure 14B:
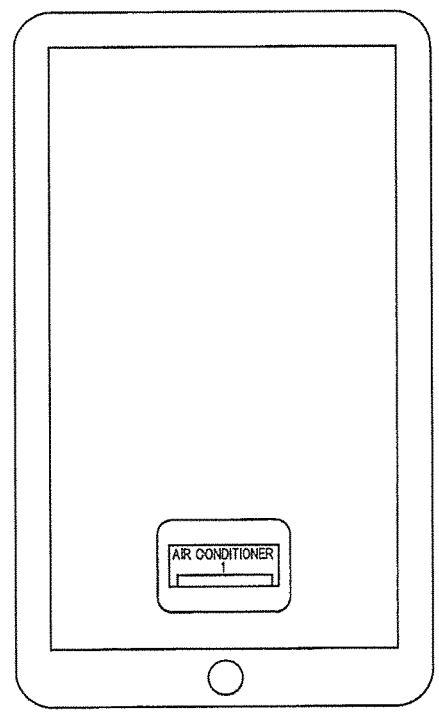
FIG. 14B depicts a display example of a touch panel of the terminal device according to the first embodiment of the present invention.
Figure 14C:
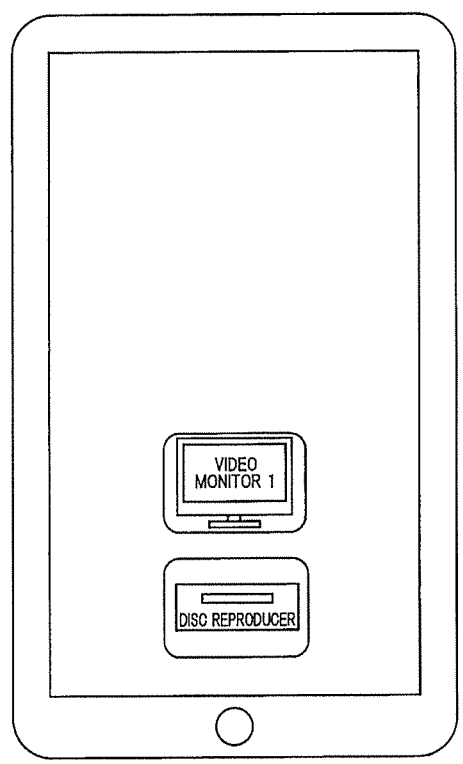
FIG. 14C depicts a display example of a touch panel of the terminal device according to the first embodiment of the present invention.
Figure 15A:
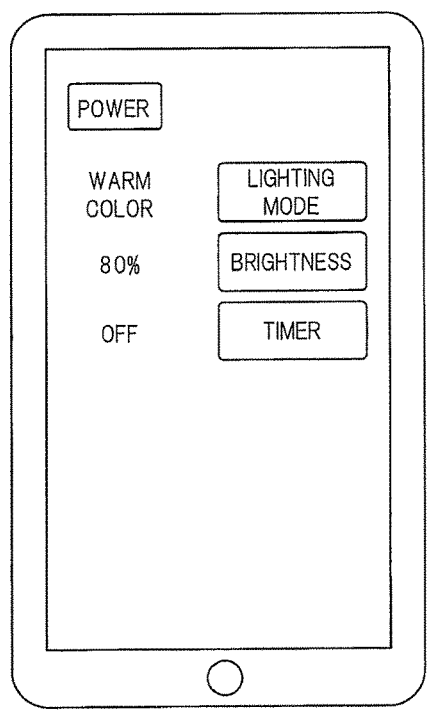
FIG. 15A depicts a display example of a touch panel of the terminal device according to the first embodiment of the present invention.
Figure 15B:
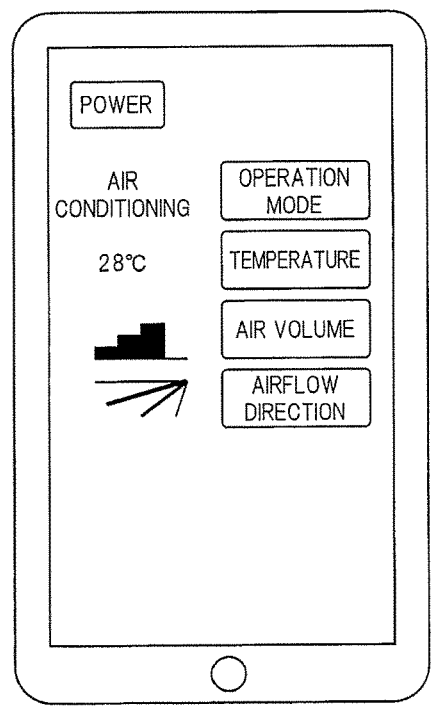
FIG. 15B depicts a display example of a touch panel of the terminal device according to the first embodiment of the present invention.
Figure 15C:
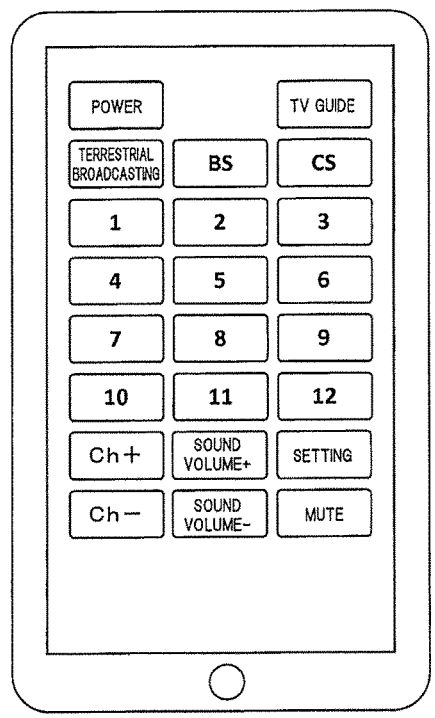
FIG. 15C depicts a display example of a touch panel of the terminal device according to the first embodiment of the present invention.
Figure 15D:
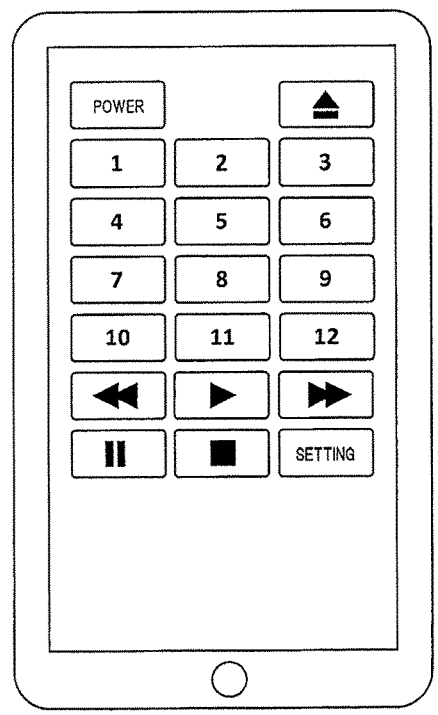
FIG. 15D depicts a display example of a touch panel of the terminal device according to the first embodiment of the present invention.

FIGS. 14A to 14C depict display examples of the touch panel of the terminal device according to the first embodiment of the present invention.

FIG. 14A depicts a display example of the touch panel in a case of directing the terminal device 1 at the illumination equipment 3a1. The touch panel displays the icon for the illumination equipment 3a1, and indicates that the illumination equipment 3a1 is present in a direction to which the terminal device 1 is pointed.

FIG. 14B depicts a display example of the touch panel in a case of directing the terminal device 1 at the air conditioner 3b1. The touch panel displays the icon for the air conditioner 3b1, and indicates that the air conditioner 3b1 is present in a direction to which the terminal device 1 is pointed.

FIG. 10C depicts a display example of the touch panel in a case of directing the terminal device 1 at the video monitor 3c1 or disc reproducer 3d1. The touch panel displays respective icons for the video monitor 3c1 and disc reproducer 3d1, and indicates that the video monitor 3c1 and disc reproducer 3d1 are present in a direction to which the terminal device 1 is pointed.

By selecting and touching anyone of these icons on the touch panel, the user starts a remote control application for a piece of intended electric equipment 3, which makes it possible to remote-control the intended electric equipment 3. In this manner, the terminal device 1 has such a configuration that the icons for the pieces of electric equipment 3 as operable objects to be remote-controlled are subsequently switched and displayed in accordance with the direction of the device 1, so that the usability to the user can be improved.

In the cases of FIGS. 11A and 11B and FIGS. 12A and 12B, when the terminal device 1 set at each location shown in FIGS. 11A and 11B and FIGS. 12A and 12B is operated, for example, the illumination equipment 3a1 can be selected if the direction of the housing of the terminal device 1 is set close to south (azimuth of 180°), and the air conditioner 3b1 can be selected if the direction of the housing of the terminal device 1 is set close to northwest (azimuth of 315°). Likewise, if the direction of the housing of the terminal device 1 is set close to north (azimuth of 0°), the video monitor 3c1 or the disc reproducer 3d1 can be selected. At this time, the tilt (elevation angle) of the housing does not affect the selection of the electric equipment.

At step S709, when the user has selected the electric equipment 3 to be remote-controlled, the terminal device 1 proceeds to step S710. When the user has not selected the electric equipment 3, the terminal device 1 returns to step S702, and the selection processing is continued.

At step S710, height information on the terminal device 1 is back-calculated from the position information and height information on the selected electric equipment 3 and from the position information on the terminal device 1 and the tilt (elevation angle) of the housing.

Subsequently, at step S711, the atmospheric pressure information detecting unit 408 of the height information acquiring unit 309 detects atmospheric pressure information, and the height information calculating unit 405 calculates height information. A difference between the calculated height information and the back-calculated height information is then found, and the height information calculating unit 405 of the height information acquiring unit 309 is calibrated so as to eliminate this difference.

At step S712, the terminal device 1 starts the remote control application corresponding to the selected electric equipment 3. At this time, the started remote control application is provided with the information on the electric equipment 3 when necessary. For example, some of the remote control applications for remote-controlling a plurality of pieces of electric equipment 3 require a specification of a type(s) of electric equipment 3 when the remote control application is started. In such a case, the remote control application is provided with information on the type of the electric equipment 3.

Subsequently, at step S713, the user is able to remote-control the electric equipment 3. When the user ends the remote control operation, the selection processing comes to an end. The user ends the remote control operation by, for example, pressing the home button of the terminal device 1 or giving a voice instruction(s). Incidentally, the electric equipment 3 as an object to be operated is kept turning on in some cases after the user ends the remote control operation once, and the remote control operation such as a channel shift of a TV etc. is considered to be continuously performed, so that the remote control application may be also left starting.

In this manner, the user narrows down the electric equipment 3 as an operation object to be remote-controlled by the terminal device 1, and can remote-control the narrowed-down electric equipment 3. The flow of the selection processing is switched depending on whether the height information acquiring unit 309 is already calibrated or not. When the height information acquiring unit 309 is not calibrated yet, the height information on the terminal device 1 is calculated in selecting the electric equipment 3. When the height information acquiring unit 309 is already calibrated, the pieces of electric equipment 3 as operation objects to be remote-controlled can be further narrowed down.

Incidentally, this embodiment shows an example of using the terminal device 1 with a posture (direction) of its housing pointed vertically, but the terminal device 1 with the posture pointed horizontally can also be used in the same manner.

FIG. 15 depicts display examples of the touch panel of the terminal device according to the first embodiment of the present invention, and shows display examples in starting the remote control application for the selected electric equipment 3. FIG. 15A depicts a display example of the touch panel in starting the remote control application for the illumination equipment 3a. FIG. 15B depicts a display example of the touch panel in starting the remote control application for the air conditioner 3b. FIG. 15C depicts a display example of the touch panel in starting the remote control application for the video monitor 3c. FIG. 15D depicts a display example of the touch panel in starting the remote control application for the disc reproducer 3d1.

According to the above configuration of the first embodiment, the terminal device 1 acquires, from the electric equipment 3, information necessary for remote-controlling the electric equipment 3 in advance. The information is acquired through, for example, near field communication. At this time, the terminal device 1 acquires position information and height information on the electric equipment 3 by using a function(s) of the terminal device 1. The terminal device 1 records and registers the acquired information in the memory unit.

Then, when the remote control launcher start button is pressed, the terminal device 1 acquires position information and height information on itself, and calculates the direction and tilt pointed to each piece of electric equipment 3 based on the position information on the registered electric equipment 3. As a result, even when the terminal device 1 is moved to a new location, the terminal device 1 at the new location can know a direction and tilt pointed to each piece of electric equipment 3 therefrom.

Further, an icon for the electric equipment 3 whose direction and tilt are closest to the direction and tilt of the housing of the terminal device 1 is displayed on the display device of the terminal device 1. By directing the terminal device 1 at the electric equipment 3 intended to be remote-controlled, the user is able to quickly select the icon for the intended electric equipment 3 out of the plurality of pieces of electric equipment 3.

If the height information acquiring unit of the terminal device 1 is not calibrated yet, the icon for the electric equipment 3 whose direction is close to the direction of the housing of the terminal device 1 is displayed on the display device of the terminal device 1. By directing the terminal device 1 at the electric equipment 3 intended to be remote-controlled, the user is able to quickly select the icon for the intended electric equipment 3 out of the plurality of pieces of electric equipment 3.

Selecting the icon causes the corresponding remote control application to start, and the intended electric equipment 3 can be remote-controlled. In addition, from the position information and height information on the selected electric equipment 3 and from the position information on the terminal device 1 and the tilt (elevation angle) of its housing, the height information on the terminal device 1 is back-calculated to calibrate the height information acquiring unit.

As described above, the user is able to control the electric equipment by a simple operation. Hence, provided are the terminal device and the remote control method whose usabilities are improved.

(Second Embodiment)

In a second embodiment in comparison with the first embodiment, added is a function of selecting a piece(s) of electric equipment 3 as an object to be remote-controlled by taking a distance between the terminal device 1 and the electric equipment 3 into consideration.

Figure 16:
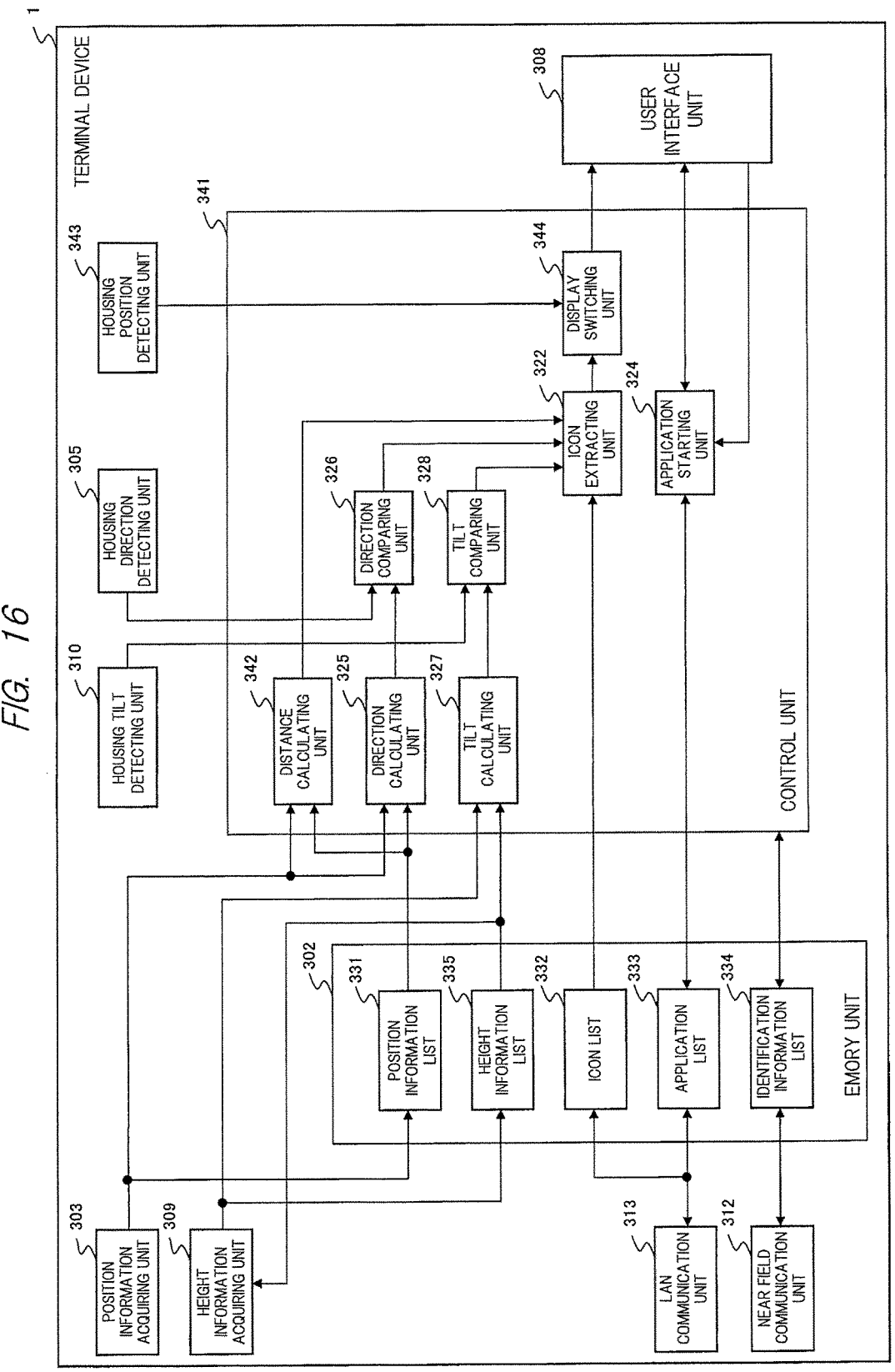
FIG. 16 is a functional block diagram of a terminal device according to a second embodiment of the present invention.

FIG. 16 is a functional block diagram of a terminal device 1 according to the second embodiment of the present invention. Each of the functional blocks of the terminal device 1 is controlled by, for example, the CPU 201 included in the terminal device 1 shown in FIG. 2, thereby operating.

A control unit 341 is a unit obtained by adding a distance calculating unit 342 and a display switching unit 344 to the control unit 310 shown in FIG. 3. Based on an instruction (s) from the user interface unit 308, the control unit 341 controls the memory unit 302, the position information acquiring unit 303, the height information acquiring unit 309, the housing direction detecting unit 305, the housing tilt detecting unit 310, the near field communication unit 312, the LAN communication unit 313, and a housing posture detecting unit 343 newly added etc. to carry out: registration of the electric equipment 3 before using the remote controller; and selection and remote control of the electric equipment 3 at a time of using the remote controller. Incidentally, a description about the same component units as those depicted in FIG. 3 is quoted above, and will be omitted appropriately.

In addition, the registration processing of the electric equipment 3 before using the remote controller is the same as the registration processing by the terminal device 1 shown in FIG. 3, and therefore a description about its processing is quoted above and will be omitted.

When the remote controller is used, the control unit 341 selects some pieces of electric equipment 3 to be remote-controlled from the pieces of electric equipment 3 registered with the memory unit 302. Firstly, the position information acquiring unit 303 acquires position information on the terminal device 1. The direction calculating unit 325 compares the acquired position information with position information on all the pieces of electric equipment 3 listed in the position information list 331 to calculate a direction (azimuth of the terminal device 1 to the electric equipment 3). Further, the distance calculating unit 342 compares the acquired position information with position information on all the pieces of electric equipment 3 listed in the position information list 331 to calculate a distance (distance between the terminal device 1 and the electric equipment 3). At the same time, the height information acquiring unit 309 acquires height information, and the tilt calculating unit 327 compares the acquired height information with the height information on all the pieces of electric equipment 3 listed in the height information list 335 to calculate a tilt (elevation angle of the terminal device 1 to the electric equipment 3).

Subsequently, the housing direction detecting unit 305 detects the direction of the housing of the terminal device 1, and the direction comparing unit 326 compares the detected direction of the housing with the direction pointed to each piece of electric equipment 3 from the terminal device 1. At the same time, the housing tilt detecting unit 310 detects the tilt of the hosing of the terminal device 1, and the tilt comparing unit 328 compares the detected tilt of the housing with the tilt pointed to each piece of electric equipment 3 from the terminal device 1. Subsequently, based on results of the above comparisons, the icon extracting unit 322 extracts, from the icon list 332, the icon for the electric equipment 3 located to have the closest direction and tilt to the direction and tilt of the housing, and the extracted icon is displayed on the user interface unit 308. Or, based on the above comparison results and calculated distance, the icon extracting unit 322 extracts, from the icon list 332, the icon for the electric equipment 3 located to have the closest direction and tilt to the direction and tilt of the housing and to exist within a predetermined distance, and the extracted icon is displayed on the user interface unit 308. Such display is switched by the display switching unit 344 based on the posture (direction) of the housing of the terminal device 1, the posture being detected by the housing posture detecting unit 343.

The housing posture detecting unit 343 uses a gravitational acceleration detected by the acceleration sensor 205 etc., thereby detecting the posture (direction) of the housing of the terminal device 1. Such a posture may be detected along with the tilt detected by using the gyro sensor 206 or be detected by using other types of sensors.

FIGS. 17A and 17B are conceptual diagrams each showing a posture of the housing of the terminal device according to the second embodiment of the present invention. Detected is whether the posture of the housing of the terminal device 1 is vertical (a housing's short side edge is closer to the ground surface than its long side edge) as shown in FIG. 17A, or horizontal (the housing's long side edge is closer to the ground surface than the short side edge) as shown in FIG. 17B. Incidentally, it is not always necessary to keep the housing perpendicular to the ground in detecting the posture of the housing.

If the height information acquiring unit 309 is not calibrated, the icon for the electric equipment 3 whose direction is close to the direction of the housing of the terminal device 1 is displayed on the display device of the terminal device 1. Or, the icon for the electric equipment 3 whose direction is close to the direction of the housing of the terminal device 1 and which is present within a predetermined distance is displayed on the display device of the terminal device 1. Such display is switched by the display switching unit 344 based on the housing posture, the housing posture being detected by the housing posture detecting unit 343.

Then, if the icon displayed on the user interface unit 308 is the icon for the intended electric equipment 3, the user selects the icon, and thereby can remote-control the intended electric equipment 3 by using the terminal device 1. By directing the terminal device 1 at the electric equipment 3 intended to be remote-controlled, the user is able to quickly select the icon for the intended electric equipment 3 out of the plurality of pieces of electric equipment 3.

Selecting the icon causes the corresponding remote control application to start, which makes it possible to remote-control the intended electric equipment 3.

Further, when the height information acquiring unit 309 is not calibrated, the height information on the terminal device 1 is back-calculated from the position information and height information on the selected electric equipment 3 and from the position information on the terminal device 1 and the tilt (elevation angle) of the housing, and the height information acquiring unit 30 is calibrated.

Figure 18:
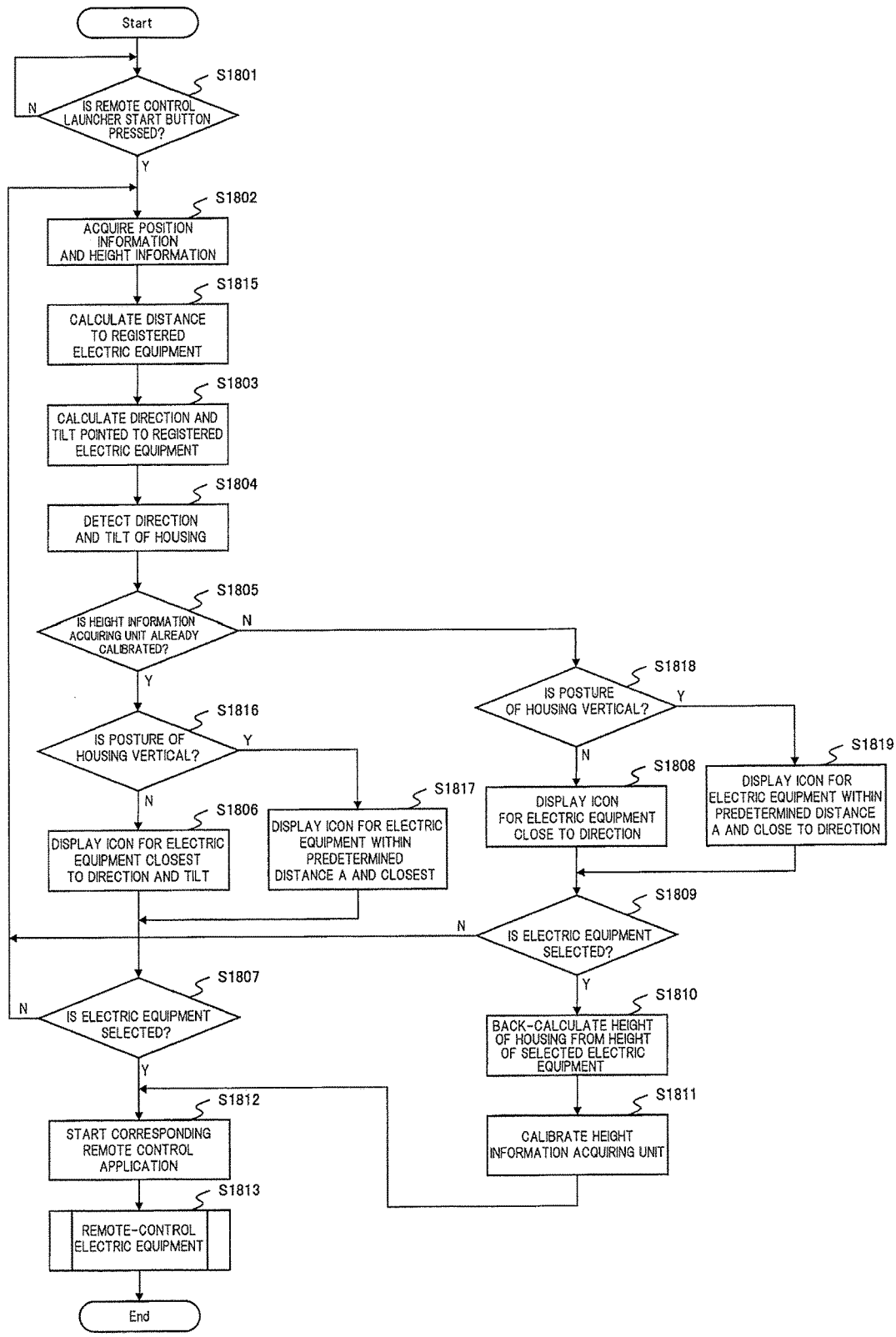
FIG. 18 is a flowchart for explaining an electric equipment selection processing according to the second embodiment of the present invention.

FIG. 18 is a flowchart of an electric equipment selection processing by the terminal device according to the second embodiment of the present invention. This flowchart depicts a processing of selecting an intended remote control application by the launcher application.

Steps S1801 and S1802 represent the same processing as steps S701 and S702 of FIG. 7. When the remote control launcher start button is pressed, the posture information acquiring unit 303 and height information acquiring unit 309 acquire the position information and height information on the terminal device 1.

Subsequently, at step S1815, the distance calculating unit 342 calculates the distance between the terminal device 1 and the electric equipment 3. The distance between the terminal device 1 and the electric equipment 3 is found from the registered position information on the electric equipment 3 and the current position information on the terminal device 1.

Steps S1803 and S1804 represent the same processing as steps S703 and S704 of FIG. 7. The direction calculating unit 325 and tilt calculating unit 327 calculate the direction and tilt pointed to the electric equipment 3 from the terminal device 1, and the housing direction detecting unit 305 and housing tilt detecting unit 310 detect the direction and tilt of the housing of the terminal device 1.

Subsequently, at step S1805, the terminal device 1 switches the flow of the selection processing depending on whether the height information acquiring unit is already calibrated or not. When the height information acquiring unit is already calibrated, the terminal device 1 proceeds to step S1816. When the height information acquiring unit is not calibrated yet, the terminal device 1 proceeds to step S1818.

When the height information acquiring unit is already calibrated, the terminal device 1 proceeds to step S1816, and switches the icon for the electric equipment 3 displayed on the user interface unit 308 according to the posture of the housing. When the posture of the housing is horizontal, the terminal device 1 displays, on the user interface unit 308, the icon for such electric equipment 3 that the direction and tilt calculated at step S1804 are closest to the direction and tilt of the housing of the terminal device 1. When the posture of the housing is vertical, the terminal device 1 displays the icon for such electric equipment 3 that the direction and tilt calculated at step S1804 are closest to the direction and tilt of the housing of the terminal device 1 and that the distance calculated at step S1815 is within a present predetermined distance "A". Incidentally, the predetermined distance A can be set in advance by the user.

Subsequently, at step S1807, if the user has selected the electric equipment 3 to be remote-controlled, the terminal device 1 proceeds to step S1812. If the user has not selected the electric equipment 3 to be remote-controlled, the terminal device 1 returns to step S1802, and continues the selection processing.

The examples displayed on the touch panel of the terminal device 1 are in the same as those shown in FIGS. 10A to 10D. The user touches one of these ions to start the remote control application for the intended electric equipment 3 to make it possible to remote-control the intended electric equipment 3.

Figure 19:
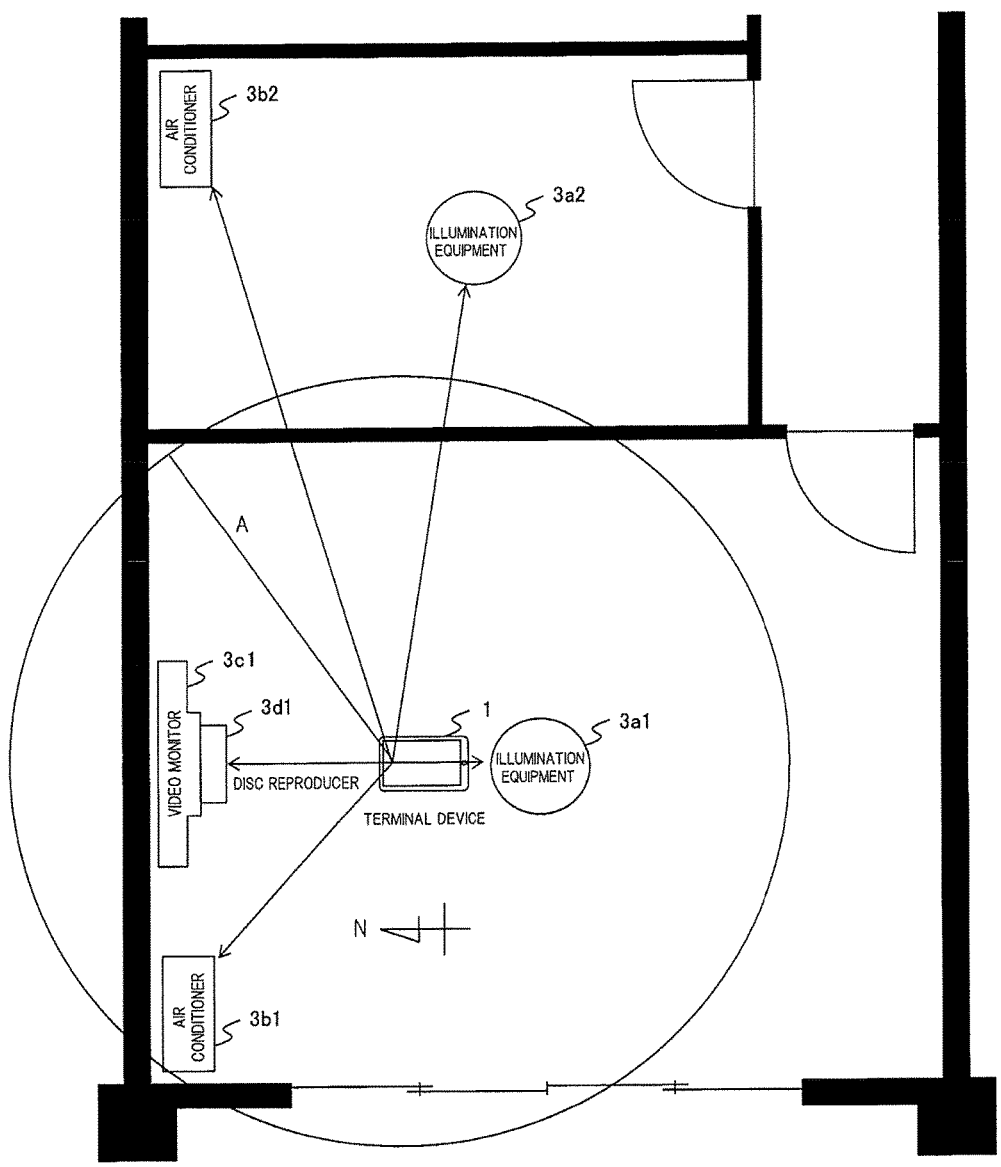
FIG. 19 is an arrangement view showing a room layout and electric equipment according to the second embodiment of the present invention.

FIG. 19 depicts an arrangement example of a room layout, a terminal device, and electric equipment according to the second embodiment of the present invention. The illumination equipment 3a1, the air conditioner 3b1, the video monitor 3c1, and the disc reproducer 3d1 are placed in the room in which the terminal device 1 exists. These pieces of electric equipment 3 are located within the given distance A to the terminal device 1. When the housing of the terminal device 1 is in a vertical position, the user selects intended electric equipment 3 out of pieces of electric equipment 3 within the predetermined distance A to remote-control the selected electric equipment 3.

The illumination equipment 3a2 and the air conditioner 3b2 are placed in another room, but these pieces of electric equipment 3 are outside the predetermined distance A. Therefore, those pieces of electric equipment cannot be selected when the housing of the terminal device 1 has the vertical posture. When the housing of the terminal device 1 has a horizontal posture, the user can select the intended electric equipment 3 out of all the pieces of electric equipment 3 including the illumination equipment 3a2 and air conditioner 3b2 arranged in another room.

When the height information acquiring unit is not calibrated yet at step S1805, the to/urinal device 1 proceeds to step S1818, and switches, depending on the posture of the housing, the icon for the electric equipment 3 displayed on the user interface unit 308. When the posture of the housing is horizontal, the terminal device 1 proceeds to step S1808, and displays, on the user interface unit 308, the icon for such electric equipment 3 that the direction calculated at step S1804 is closest to the direction of the housing of the terminal device 1. When the posture of the housing is vertical, the terminal device 1 proceeds to step S1809, and displays, on the user interface unit 308, the icon for such electric equipment 3 that the direction calculated at step S1804 is closest to the direction of the housing of the terminal device 1 and that the distance calculated at step S1815 is present within the present predetermined distance A.

The user touches and selects one of these ions on the touch panel, thereby starting the remote control application for the intended electric equipment 3 to remote-control the intended electric equipment 3.

In FIG. 19, when the housing of the terminal device 1 has the vertical posture, the user selects intended electric equipment 3 out of the pieces of electric equipment 3 within the predetermined distance A to remote-control the selected electric equipment 3. When the housing of the terminal device 1 has the horizontal posture, the user can select the intended electric equipment 3 out of all the pieces of electric equipment 3 including the illumination equipment 3a2 and air conditioner 3b2 arranged in another room.

At step S1809, when the user has selected the electric equipment 3 to be remote-controlled, the terminal device 1 proceeds to step S1810. When the user has not selected the electric equipment 3 to be remote-controlled, the terminal device 1 returns to step S1802, and continues the selection processing.

Steps S1810 and S1811 have the same processings as steps S710 and S711 of FIG. 7. At these steps, the height information on the terminal device 1 is back-calculated from the position information and height information on the selected electric equipment 3 and from the position information on the terminal device 1 and the tilt (elevation angle) of the housing, the atmospheric pressure information is detected, and the height information is calculated. A difference between this calculated height information and the back-calculated height information is then found, and the height information acquiring unit 309 is calibrated to eliminate this difference.

When the height information acquiring unit is already calibrated at step S1805, the terminal device 1 proceeds to step S1816, and switches, depending on the posture of the housing, the icon for the electric equipment 3 displayed on the user interface unit 308. When the posture of the housing is horizontal, the terminal device 1 proceeds to step S1807, and displays, on the user interface unit 308, the icon for such electric equipment 3 that the direction and tilt calculated at step S1804 are closest to the direction and tilt of the housing of the terminal device 1. When the posture of the housing is vertical, the terminal device 1 proceeds to step S1806, and displays, on the user interface unit 308, the icon for such electric equipment 3 that the direction and tilt calculated at step S1804 are closest to the direction and tilt of the housing of the terminal device 1 and that the distance calculated at step S1815 is present within the present predetermined distance A.

At step S1807, when the user has selected the electric equipment 3 to be remote-controlled, the terminal device 1 proceeds to step S1812. When the user has not select electric equipment 3 to be remote-controlled, the terminal device 1 returns to step S1802, and continues the selection processing.

Steps S1812 and S1813 have the same processings as steps S712 and S713 of FIG. 7. At these steps, the remote control application corresponding to the electric equipment 3 selected at step S1807 or S1809 is started, and the user can remote-control the electric equipment 3.

In this manner, the user narrows down the electric equipment 3 as an operation object to be remote-controlled by the terminal device 1, and can remote-control the selected electric equipment 3. The flow of the selection processing is switched depending on whether the height information acquiring unit 309 is already calibrated or not. When the height information acquiring unit 309 is not calibrated yet, the height information on the terminal device 1 is calculated in selecting the electric equipment 3, and the height information acquiring unit 309 can be calibrated. When the height information acquiring unit 309 is already calibrated, the electric equipment 3 as an operation object to be remote-controlled can be further narrowed down. In addition, the flow of the selection processing is switched depending on whether the housing has the horizontal posture or the vertical posture. When the housing has the horizontal posture, only the electric equipment 3 within the predetermined distance becomes the operation object to remote-controlled, so that the electric equipment 3 to be remote-controlled can be further narrowed down.

Incidentally, if the predetermined distance A at steps S1817 and S1819 is determined by considering, for example, a size of the room furnished with the electric equipment 3, only the electric equipment 3 placed in the room can be displayed on the user interface unit 308. In addition, the predetermined distance may be changed depending on the posture information. For example, even if there are a plurality of rooms and the respective rooms are different in size, only the electric equipment 3 in each room can be displayed. Further, when the remote control start button is pressed, for example, the size of the room is estimated through a distance from the terminal device 1 to the closest registered air conditioner 3b1, and thereby the predetermined distance A may be determined automatically. In addition, information on the room, in which the electric equipment 3 is placed in registering the electric equipment 3, is also registered, and only the electric equipment 3 placed in the room, in which the terminal device 1 is present, may be displayed. In addition, the distance A may be determined so at to match an arrival distance of infrared rays etc. from the dedicated remote controller 2 for the electric equipment 3.

Through the above configuration, the second embodiment can obtain the same effect as the first embodiment.

Further, by changing the direction of the housing, the terminal device 1 can display, on the display device, only the icon for the electric equipment 3 located within the preset predetermined distance. An icon for another piece of electric equipment 3 at a distant place such as another room is not displayed during selection of the electric equipment 3 in a certain room. Hence, an icon(s) for the intended electric equipment 3 can be selected quickly from icons for the plurality of pieces of equipment 3.

(Third Embodiment)

In a third embodiment, when the intended electric equipment 3 is not displayed despite the terminal device 1 being directed at the electric equipment 3 intended to be remote-controlled, a function of selecting the intended electric equipment 3 is added to the first embodiment.

Figure 20:
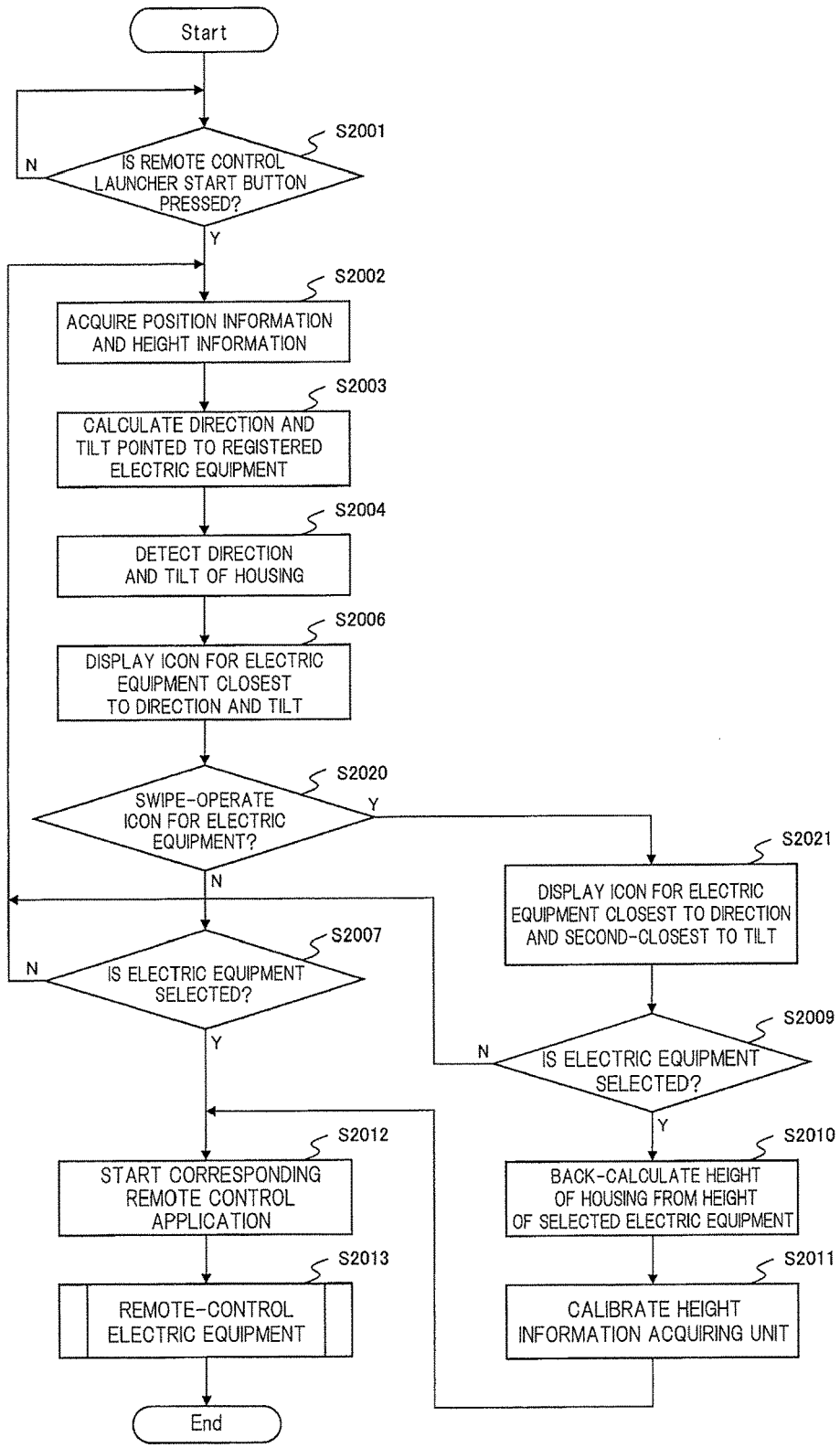
FIG. 20 is a flowchart for explaining an electric equipment selection processing according to a third embodiment of the present invention.

FIG. 20 is a flowchart of an electric equipment selection processing by a terminal device according to a third embodiment of the present invention. This flowchart depicts a processing of selecting the intended remote control application by the launcher application.

Steps S2001 and S2004 have the same processings as steps S701 and S704 of FIG. 7. When the remote control launcher start button is pressed, the position information acquiring unit 303 and the height information acquiring unit 309 acquire position information and height information on the terminal device 1, the direction calculating unit 325 and the tilt calculating unit 327 calculate the direction and tilt pointed to the electric equipment 3 from the terminal device 1, and the housing direction detecting unit 305 and the housing tilt detecting unit 310 detect the direction and tilt of the housing of the terminal device 1.

Subsequently, at step S2006, the control unit 301 displays, on the user interface unit 308, the icon for such electric equipment 3 that the direction and tilt calculated at step S2004 are closest to the direction and tilt of the housing of the terminal device 1.

Subsequently, at step S2020, the flow of the selection processing is switched depending on whether the user has swipe-operated the displayed icon for the electric equipment 3. The swipe operation is an operation of sliding a finger(s) with it touching the screen. When the user has swipe-operated the icon for such electric equipment 3 that the direction and tilt calculated at step S2004 are closest to the direction and tilt of the housing of the terminal device 1, the terminal device 1 proceeds to step S2021, displays, on the user interface unit 308, the icon for such electric equipment 3 as to be closest to the direction of the housing of the terminal device 1 and second-closest to the tilt of the housing, and proceeds to step S2009. When the piece of electric equipment 3 is present in a positive or/and negative direction of the tilt, the icon to be displayed is switched depending on a direction of the swipe operation.

When the intended electric equipment 3 is not displayed even after directing the terminal device 1 at the electric equipment 3 intended to be remote-controlled and different electric equipment 3 is displayed, the user swipe-operates, without changing the direction and tilt of the terminal device 1, the icon for the displayed electric equipment 3, to cause the user interface unit 308 to display the icon for the intended electric equipment 3.

At step S2009, when the user has selected electric equipment 3 to be remote-controlled, the terminal device 1 proceeds to step S2010. When the user has not selected the electric equipment 3 to be remote-controlled, the terminal device 1 returns to step S2002, and continues the selection processing.

Steps S2010 and S2011 have the same processings as steps S710 and S711 of FIG. 7. At these steps, from the position information and height information on the selected electric equipment 3 and from the position information on the terminal device 1 and the tilt (elevation angle) of the housing, the height information on the terminal device 1 is back-calculated and the height information acquiring unit 309 is calculated. The position information may further be calibrated.

When the user does not perform the swipe operation at step S2020, the terminal device 1 proceeds to step S2007.

At step S2007, when the user has selected the electric equipment 3 to be remote-controlled, the terminal device 1 proceeds to step S2012. When the user has not selected the electric equipment 3 to be remote-controlled, the terminal device 1 returns to step S2002, and continues the selection processing.

Steps S2012 and S2013 have the same processings as steps S712 and S713 of FIG. 7. At these steps, the terminal device 1 starts the remote control application corresponding to the selected electric equipment 3, and the user can remote-control the electric equipment 3.

In this manner, the user narrows down the electric equipment 3 as an operation object to be remote-controlled by the terminal device 1, and can remote-control the selected electric equipment 3. If the selected electric equipment 3 is not the intended electric equipment 3, the user performs the swipe operation to select the intended electric equipment 3, and thereby can calibrate the height information acquiring unit 309.

Through the above configuration, the third embodiment can obtain the same effect as the first embodiment.

If the intended electric equipment 3 is not displayed even after directing the terminal device 1 at electric equipment 3 intended to be remote-controlled and different electric equipment 3 is displayed, the user swipe-operates, without changing the direction and tilt of the terminal device 1, the icon for the displayed electric equipment 3 to cause the user interface unit to display the icon for the intended electric equipment 3, and can select the intended electric equipment. In addition, at this time, the user calibrates the height information acquiring unit 309.

(Fourth Embodiment)

In a fourth embodiment, when the intended electric equipment 3 is not displayed despite the terminal device 1 being directed at the electric equipment 3 intended to be remote-controlled, a function of selecting the intended electric equipment 3 is added to the first embodiment. This additional function is, however, different from the additional function of the third embodiment.

Figure 21:
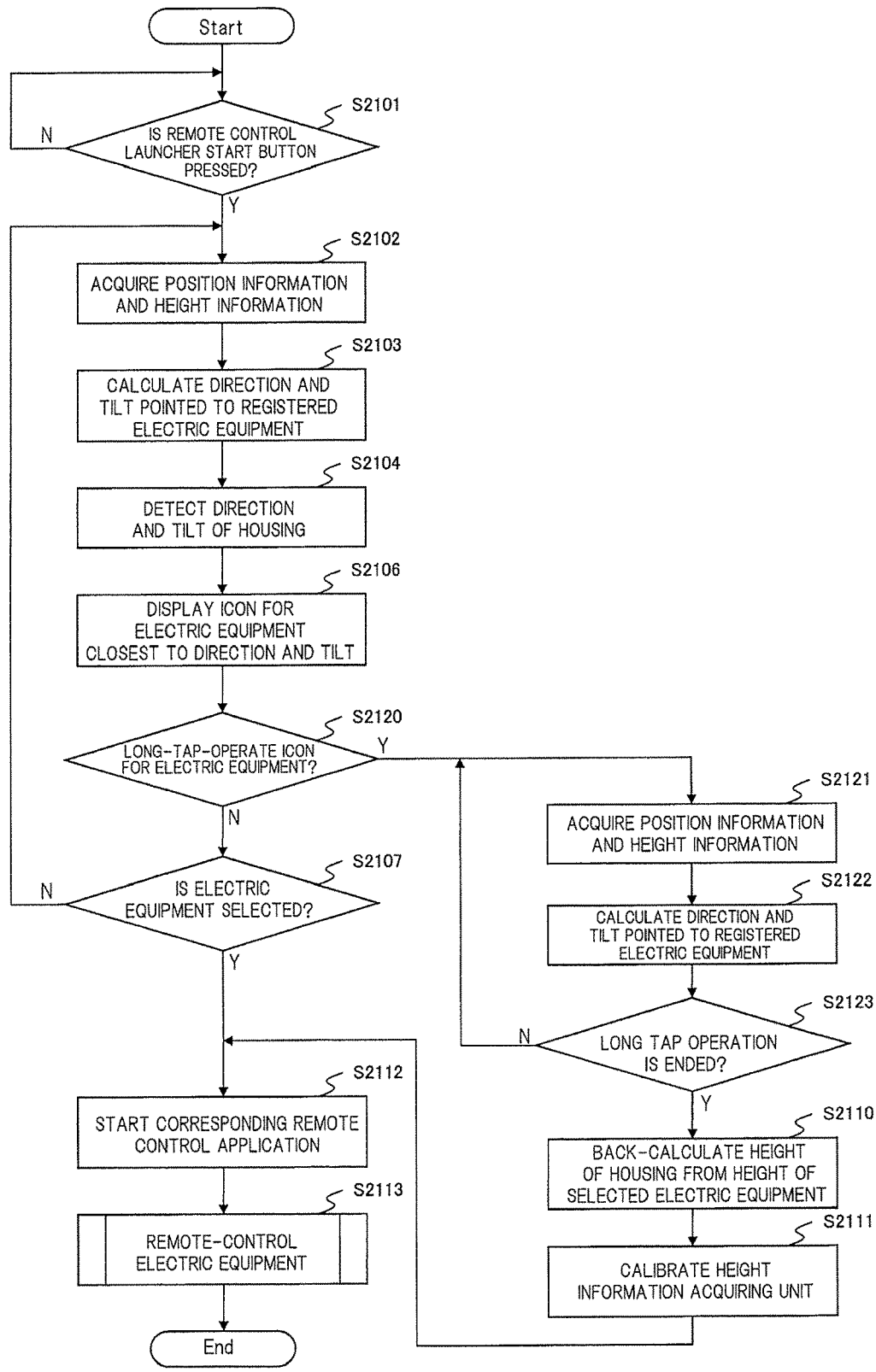
FIG. 21 is a flowchart for explaining an electric equipment selection processing according to a fourth embodiment of the present invention.

FIG. 21 is a flowchart of an electric equipment selection processing by the terminal device according to the fourth embodiment of the present invention. This flowchart depicts a processing of selecting an intended remote control application by the launcher application.

Steps S2101 to S2104 have the same processings as steps S701 to S704 of FIG. 7. At these steps, when the remote control launcher start button is pressed, the position information acquiring unit 303 and the height information acquiring unit 309 acquire position information and height information on the terminal device 1, the direction calculating unit 325 and the tilt calculating unit 327 calculate the direction and tilt pointed to the electric equipment 3 from the terminal device 1, and the housing direction detecting unit 305 and the housing tilt detecting unit 310 detect the direction and tilt of the housing of the terminal device 1.

Subsequently, at step S2106, the control unit 301 displays, on the user interface unit 308, the icon for such electric equipment 3 that the direction and tilt calculated at step S2104 are closest to the direction and tilt of the housing of the terminal device 1.

Subsequently, at step S2120, the flow of the selection processing is switched depending on whether the user has long-tap-operated the displayed icon for the electric equipment 3. The long tap operation is an operation of keeping a finger(s) touching the screen for a given time and then separating the finger from the screen. This operation corresponds to a so-called long press with respect to a tapping operation. When the user has long-tap-operated the icon for such electric equipment 3 that the direction and tilt calculated at step S2104 are closest to the direction and tilt of the housing of the terminal device 1, the terminal device 1 proceeds to step S2121 with the electric equipment 3 selected. At step S2121, the position information acquiring unit 303 and the height information acquiring unit 309 acquire position information and height information on the terminal device 1 and proceed to step S2122, and the housing direction detecting unit 305 and the housing tilt detecting unit 310 detect the direction and tilt of the housing of the terminal device 1.

At step S2123, when the long tap operation is ended, the terminal device 1 proceeds to step S2110. When the long tap operation is not ended, the terminal device 1 returns to step S2121, and continues the selection processing.

When the intended electric equipment 3 is not displayed even after directing the terminal device 1 at electric equipment 3 intended to be remote-controlled and different electric equipment 3 is displayed, the user changes the direction or tilt of the terminal device 1 to cause the user interface unit to display the icon for the intended electric equipment 3, and long-tap-operates the icon. The user then directs the terminal device 1 at the electric equipment 3 intended to be remote-controlled and ends the long tap operation.

Steps S2110 and S2111 have the same processings as steps S710 and S711 of FIG. 7. At these steps, from the position information and height information on the selected electric equipment 3 and from the position information on the terminal device 1 and the tilt (elevation angle) of the housing, the height information on the terminal device 1 is back-calculated to calibrate the height information acquiring unit 309. Further, the position information may also be calibrated.

At step S2120, when the user does not long-tap-operate the displayed icon for the electric equipment 3, the terminal device 1 proceeds to step S2107. At step S2107, when the user long-tap-operates the displayed icon for the electric equipment 3 to select the electric equipment 3, the terminal device 1 proceeds to step S2112. When the user does not select the electric equipment 3, the terminal device 1 returns to step S2102, and continues the selection processing.

Steps S2112 and S2113 have the same processings as steps S712 and S713 of FIG. 7. At these steps, the terminal device 1 starts the remote control application corresponding to the selected electric equipment 3, and the user can remote-control the electric equipment 3.

In this manner, the user narrows down the electric equipment 3 as an operation object to be remote-controlled by the terminal device 1, and remote-control the selected electric equipment 3. When the narrowed-down electric equipment 3 is not the intended electric equipment 3, the user selects the intended electric equipment 3 by the long tap operation, and can calibrate the height information acquiring unit 309.

Through the above configuration, the fourth embodiment can obtain the same effect as the first embodiment.

Further, when the intended electric equipment 3 is not displayed even after directing the terminal device 1 at the electric equipment 3 intended to be remote-controlled and different electric equipment 3 is displayed, the user changes the direction or tilt of the terminal device 1 to cause the user interface unit to display the icon for the intended electric equipment 3, and can long-tap-operate the icon to select the intended electric equipment 3. In addition, the user directs the terminal device 1 at the electric equipment 3 intended to be remote-controlled with the icon long-tap-operated, and calibrates the height information acquiring unit 309 in ending the long tap operation.

(Fifth Embodiment)

In a fifth embodiment, added is a function of carrying out calibration only in a case where the tilt of the housing is small in selecting the electric equipment 3 intended to be remote-controlled by the terminal device 1.

Figure 22:
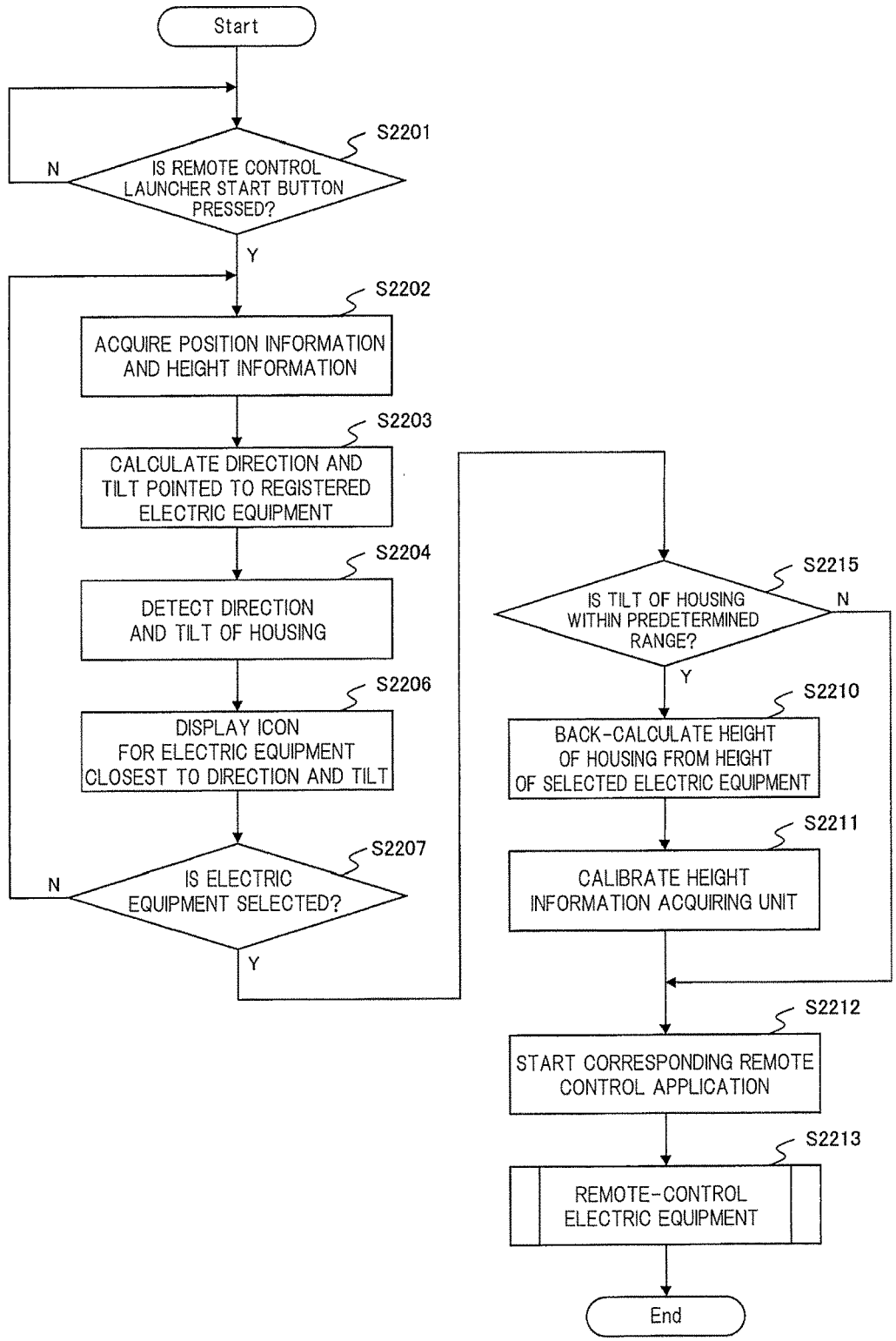
FIG. 22 is a flowchart for explaining an electric equipment selection processing according to a fifth embodiment of the present invention.

FIG. 22 is a flowchart of an electric equipment selection processing by a terminal device according to a fifth embodiment of the present invention. This flowchart depicts a processing of selecting an intended remote control application by the launcher application.

Steps S2201 to S2204 have the same processings as steps S701 to S704 of FIG. 7. At these steps, when the remote control launcher start button is pressed, the position information acquiring unit 303 and the height information acquiring unit 309 acquire position information and height information on the terminal device 1, the direction calculating unit 325 and the tilt calculating unit 327 calculate the direction and tilt pointed to the electric equipment 3 from the terminal device 1, and the housing direction detecting unit 305 and the housing tilt detecting unit 310 detect the direction and tilt of the housing of the terminal device 1.

Subsequently, at step S2206, the control unit 301 displays, on the user interface unit 308, the icon for such electric equipment 3 that the direction and tilt calculated at step S2004 are closest to the direction and tilt of the housing of the terminal device 1.

Subsequently, at step S2207, when the user has selected the electric equipment 3 to be remote-controlled, the terminal device 1 proceeds to step S2215. When the user has not selected the electric equipment 3 to be remote-controlled, the terminal device 1 returns to step S2202, and continues the selection processing.

At step S2215, the terminal device 1 switches the flow of the selection processing depending on whether the tilt of the housing of the terminal device 1 is within a predetermined range. When the tilt of the housing of the terminal device 1 is small, the height information can be calculated with high accuracy even if the accuracy of the position information on the terminal device 1 is low or the position information thereon is not acquired at all.

For example, when the tilt of the housing of the terminal device 1 is within the predetermined range (e.g., ±5°) relative to the horizontal, the terminal device 1 proceeds to step S2210. When the tilt is not present within the predetermined range, the terminal device 1 proceeds to step S2212 without interposing steps S2210 and S2211.

Steps S2210 and S2211 have the same processings as steps S710 and S711 of FIG. 7. At these steps, from the position information and height information on the selected electric equipment 3 and from the position information on the terminal device 1 and the tilt (elevation angle) of the housing, the height information on the terminal device 1 is back-calculated to calibrate the height information acquiring unit 309. At this time, the height information is calculated by setting, as a fixed value (for example, 2 m), a distance between the terminal device 1 and the selected electric equipment 3. Further, the position information may also be calibrated.

Steps S2212 and S2213 have the same processings as steps S712 and S713 of FIG. 7. At these steps, the terminal device 1 starts the remote control application corresponding to the selected electric equipment 3, and the user can remote-control the electric equipment 3.

In this manner, the user narrows down the electric equipment 3 as an operation object to be remote-controlled by the terminal device 1, and remote-control the selected electric equipment 3. The user is able to calibrate the height information acquiring unit 309 only in the case where the tilt of the housing is within the predetermined range in selecting the intended electric equipment 3.

Through the above configuration, the fifth embodiment can obtain the same effect as the first embodiment.

Further, when the terminal device 1 has selected the electric equipment 3 intended to be remote-controlled, calibration is carried out only in the case where the tilt of the housing is within the predetermined range. Even if the accuracy of the position information on the terminal device 1 is low or the position information is not acquired at all, the height information is calculated with high accuracy, and thereby the position information can be calibrated.

Incidentally, the embodiments above have been described in detail so as to make the present invention easily understood, and the present invention is not always limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

A part or all of the above respective constituent elements, functions, processing units, and processing means, etc. may be realized in the form of hardware through, for example, design etc. by an integrated circuit(s). In addition, the above constituent elements, and functions, etc. may be realized in the form of such software that a processor interprets and executes a program for realizing each function. Data of programs, tables, and files, etc. for achieving the respective functions may be stored in a memory; a recording device such as hard disc and SSD (Solid State Drive); or a recording medium such as IC card and SD card.

In addition, some of control lines and data lines are considered to be necessary for the description are depicted, so that all the control lines and data lines are not necessarily depicted about a product. Actually, most of the constituent elements may be considered to be interconnected.

EXPLANATION OF LETTERS OR NUMERALS

1 . . . terminal device; 2 . . . remote controller; 3 . . . electric equipment; 4 . . . wireless router; and 5 . . . network.

The invention claimed is:

1. A terminal device remote-controlling at least one piece of electric equipment, the terminal device comprising:
   a position information acquiring unit acquiring position information on the terminal device;
   a height information acquiring unit acquiring height information on the terminal device;
   a direction detecting unit detecting a direction to which the terminal device is pointed;
   a tilt detecting unit detecting a tilt of the terminal device; and
   a memory unit storing position information and height information on the electric equipment,
   wherein the height information on the terminal device is calculated from the position information and height information on the electric equipment stored in the memory unit and from the position information on and the tilt of the terminal device, and the height information acquiring unit is calibrated based on the calculated height information on the terminal device.

2. The terminal device according to claim 1, further comprising a user interface unit that displays information to a user,
   wherein display of the user interface unit is switched depending on whether the height information acquiring unit has been calibrated or not.

3. The terminal device according to claim 2,
   wherein when the height information acquiring unit has not been calibrated, icons for the pieces of electric equipment present within a predetermined range in the direction to which the terminal device is pointed are displayed so as to be arranged in order based on the height information on the electric equipment, and when the height information acquiring unit has been calibrated, an icon for the electric equipment located at a place closest to the terminal device among the pieces of electric equipment present within a predetermined range in the direction and tilt to which the terminal device is pointed is displayed on the user interface unit.

4. The terminal device according to claim 3, further comprising a distance calculating unit that calculates a distance between the electric equipment and the terminal device from the position information on the electric equipment stored in the memory unit and from the position information on the terminal device, wherein the electric equipment located at a place where a distance calculated by the distance calculating unit exceeds a predetermined value is excluded.

5. The terminal device according to claim 4, further comprising a housing posture calculating unit that calculates a posture of a housing of the terminal device, wherein the predetermined value is changed depending on the posture of the housing of the terminal device, the posture being calculated by the housing posture calculating unit.

6. A terminal device remote-controlling one or more pieces of electric equipment, the terminal device comprising:

a position information acquiring unit acquiring position information on the terminal device;

a height information acquiring unit acquiring height information on the terminal device;

a direction detecting unit detecting a direction to which the terminal device is pointed;

a tilt detecting unit detecting a tilt of the terminal device;

a memory unit storing first position information and first height information on a first piece of the electric equipment and second position information and second height information on a second piece of the electric equipment, the first piece of the electric equipment located at a place closest to the terminal device among the one or more pieces of electric equipment present within a predetermined range in the direction and tilt to which the terminal device is pointed, the second piece of the electric equipment located at a place second-closest to the terminal device among the one or more pieces of electric equipment present within the predetermined range in the direction and tilt to which the terminal device is pointed; and a user interface unit displaying information to a user, wherein a first icon for the first piece of the electric equipment is displayed on the user interface unit, wherein when the user long-tap-operates the user interface unit, the displaying of the first icon for the first piece of the electric equipment on the user interface unit is maintained, wherein when the user swipe-operates the user interface unit, the displaying of the first icon for the first piece of the electric equipment switches and a second icon for the second piece of the electric equipment is displayed on the user interface unit, and wherein when the user selects the first piece of the electric equipment, first height information on the terminal device is calculated from the first position information and the first height information on the electric equipment stored in the memory unit and from the position information on and the tilt of the terminal device, and the height information acquiring unit is calibrated based on the calculated first height information on the terminal device.

7. The terminal device according to claim 6, wherein when the user selects the second piece of the electric equipment, second height information on the terminal device is calculated from the second position information and second height information on the electric equipment stored in the memory unit and from the position information on and the tilt of the terminal device, and the height information acquiring unit is calibrated based on the calculated second height information on the terminal device.

8. The terminal device according to claim 6, wherein when the user has long-tap-operated the user interface unit, the displaying of the first icon for the first piece of the electric equipment on the user interface unit is maintained even if the direction and tilt of the terminal device are changed, and in releasing a long tap operation and selecting the first piece of the electric equipment, the first height information on the terminal device is calculated from the first position information and the first height information on the electric equipment stored in the memory unit and from the position information on and tilt of the terminal device, and the height information acquiring unit is calibrated.

9. The terminal device according to claim 1, wherein when the tilt of the terminal device exceeds a predetermined value, the height information acquiring unit is not calibrated.

10. A remote control method of a terminal device that remote-controls at least one piece of electric equipment, the remote control method comprising the steps:

acquiring position information on the terminal device;

acquiring height information on the terminal device;

detecting a direction to which the terminal device is pointed;

detecting a tilt of the terminal device;

storing position information and height information on the electric equipment; and calculating the height information on the terminal device from the position information and height information on the electric equipment stored in the memory unit and from the position information on and the tilt of the terminal device, and calibrating the height information acquiring unit based on the calculated height information on the terminal device.

11. The terminal device according to claim 1, wherein the height information on the terminal device is calculated from the position information and the height information on the electric equipment stored in the memory unit and from the height information and the tilt of the terminal device, and the height information acquiring unit is calibrated so as to correct the height information on the terminal device acquired by the height information acquiring unit based on the height information on the terminal device.

12. The terminal device according to claim 6, wherein the height information on the terminal device is calculated from the position information and the height information on the electric equipment stored in the memory unit and from the height information and the tilt of the terminal device, and the height information acquiring unit is calibrated so as to correct the height information on the terminal device acquired by the height information acquiring unit based on the height information on the terminal device.

* * * * *